US012596956B2

(12) United States Patent
Totsuka et al.

(10) Patent No.: US 12,596,956 B2
(45) Date of Patent: Apr. 7, 2026

(54) INFORMATION PROCESSING DEVICE AND INFORMATION PROCESSING METHOD FOR PRESENTING REACTION-ADAPTIVE EXPLANATION OF AUTOMATIC OPERATIONS

(71) Applicant: SONY GROUP CORPORATION, Tokyo (JP)

(72) Inventors: Noriko Totsuka, Tokyo (JP); Michael Hentschel, Tokyo (JP); Hiroaki Ogawa, Tokyo (JP); Yasuharu Asano, Tokyo (JP); Akira Takahashi, Tokyo (JP); Chika Myoga, Tokyo (JP); Masanobu Nakamura, Tokyo (JP); Kana Nishikawa, Tokyo (JP); Chie Yamada, Tokyo (JP); Masahiro Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 722 days.

(21) Appl. No.: 17/907,540

(22) PCT Filed: Feb. 10, 2021

(86) PCT No.: PCT/JP2021/005122
§ 371 (c)(1),
(2) Date: Sep. 28, 2022

(87) PCT Pub. No.: WO2021/205742
PCT Pub. Date: Oct. 14, 2021

(65) Prior Publication Data
US 2023/0147985 A1       May 11, 2023

(30) Foreign Application Priority Data
Apr. 8, 2020    (JP) ................................. 2020-070086

(51) Int. Cl.
*G06V 40/16*          (2022.01)
*G06N 20/00*          (2019.01)
*G10L 25/63*          (2013.01)

(52) U.S. Cl.
CPC ........... *G06N 20/00* (2019.01); *G06V 40/174* (2022.01); *G10L 25/63* (2013.01); *G06F 2203/011* (2013.01)

(58) Field of Classification Search
CPC .............. G06F 2203/011; G06N 20/00; G06V 40/174; G10L 25/63
See application file for complete search history.

(56) References Cited

U.S. PATENT DOCUMENTS 10,846,517 B1 *  11/2020  Bulusu ................. G06V 40/161
2016/0280220 A1 *  9/2016  Parundekar ....... B60W 50/0098
(Continued)

FOREIGN PATENT DOCUMENTS

JP        2001-166803 A      6/2001
JP        2007-011674 A      1/2007
(Continued)

OTHER PUBLICATIONS

International Search Report and Written Opinion of PCT Application No. PCT/JP2021/005122, issued on May 11, 2021, 08 pages of ISRWO.

*Primary Examiner* — Beau D Spratt
(74) *Attorney, Agent, or Firm* — CHIP LAW GROUP

(57) ABSTRACT

Provided is an information processing apparatus that performs processing of presenting an explanation for a reason why a control-target apparatus has performed an automatic operation. The information processing apparatus includes a determination unit that determines processing in a control-target apparatus corresponding to sensor information, a generation unit that generates an explanation for a reason for the processing, and an estimation unit that performs an (Continued)

1401

SUBTITLES ARE DISPLAYED
BECAUSE LEVEL OF NOISE
NEAR TELEVISION IS HIGH estimation with respect to a reaction from a user. The generation unit controls presentation of the explanation on the basis of a result of the estimation with respect to the reaction from the user. The generation unit controls, on the basis of the result of the estimation, contents of the explanation or a method of presenting the explanation.

19 Claims, 17 Drawing Sheets

(56)                    References Cited

U.S. PATENT DOCUMENTS

| | | |
|---|---|---|
| 2018/0117769 A1 | 5/2018 | Delazari Binotto et al. |
| 2019/0266999 A1* | 8/2019 | Chandrasekaran ..... G06F 3/167 |
| 2020/0139077 A1* | 5/2020 | Biradar ................... G10L 25/63 |
| 2020/0239004 A1* | 7/2020 | Sobhany .................. B60N 2/02 |
| 2020/0363794 A1* | 11/2020 | Schuster ................. G06N 5/04 |
| 2021/0020024 A1* | 1/2021 | Meister .................. G08B 21/06 |
| 2021/0237759 A1* | 8/2021 | Wray ................ B60W 60/0011 |

FOREIGN PATENT DOCUMENTS

| | | |
|---|---|---|
| JP | 2007323233 A | 12/2007 |
| JP | 2016-192020 A | 11/2016 |
| JP | 2019-082883 A | 5/2019 |

* cited by examiner

F I G . 1
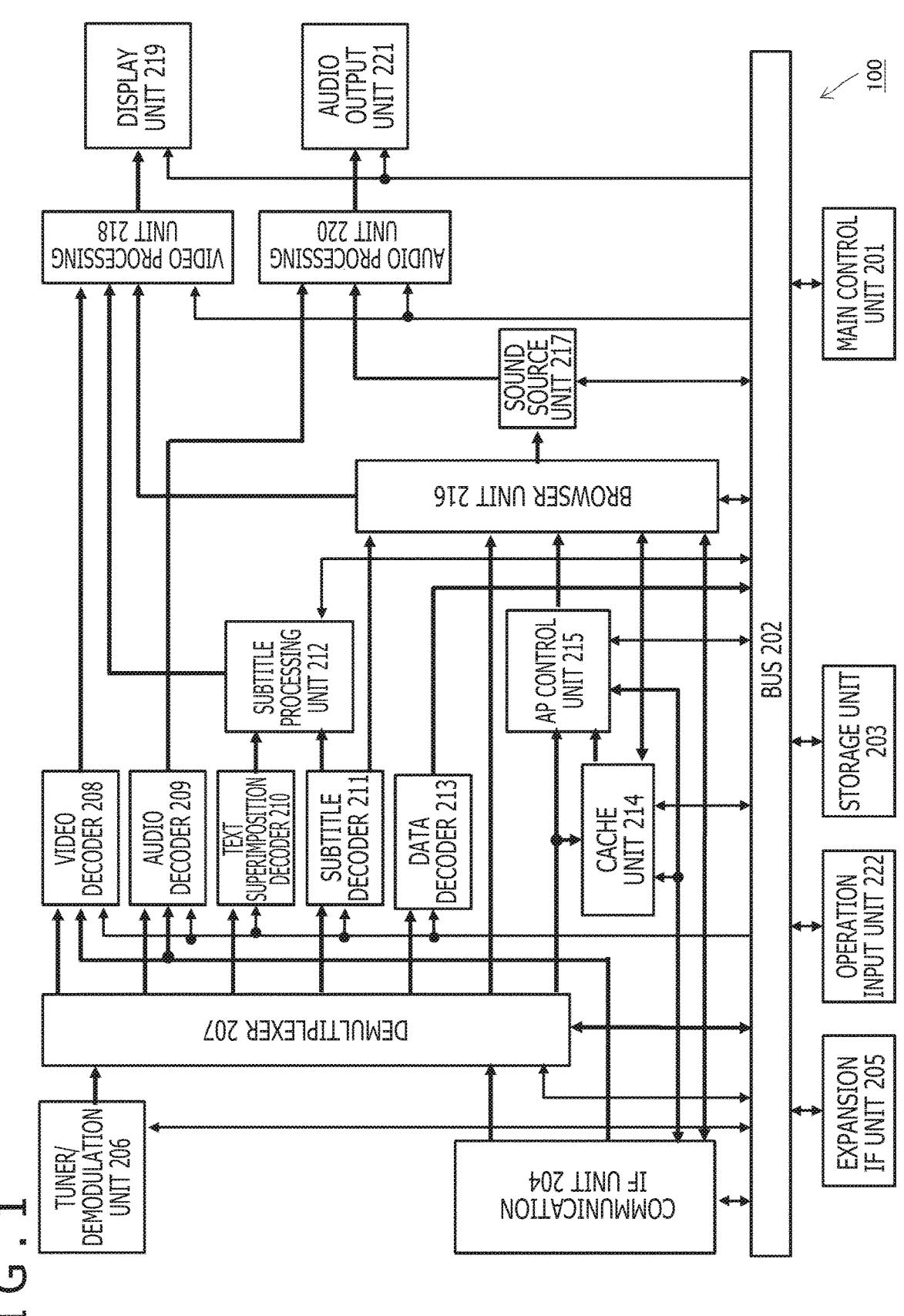

FIG.2

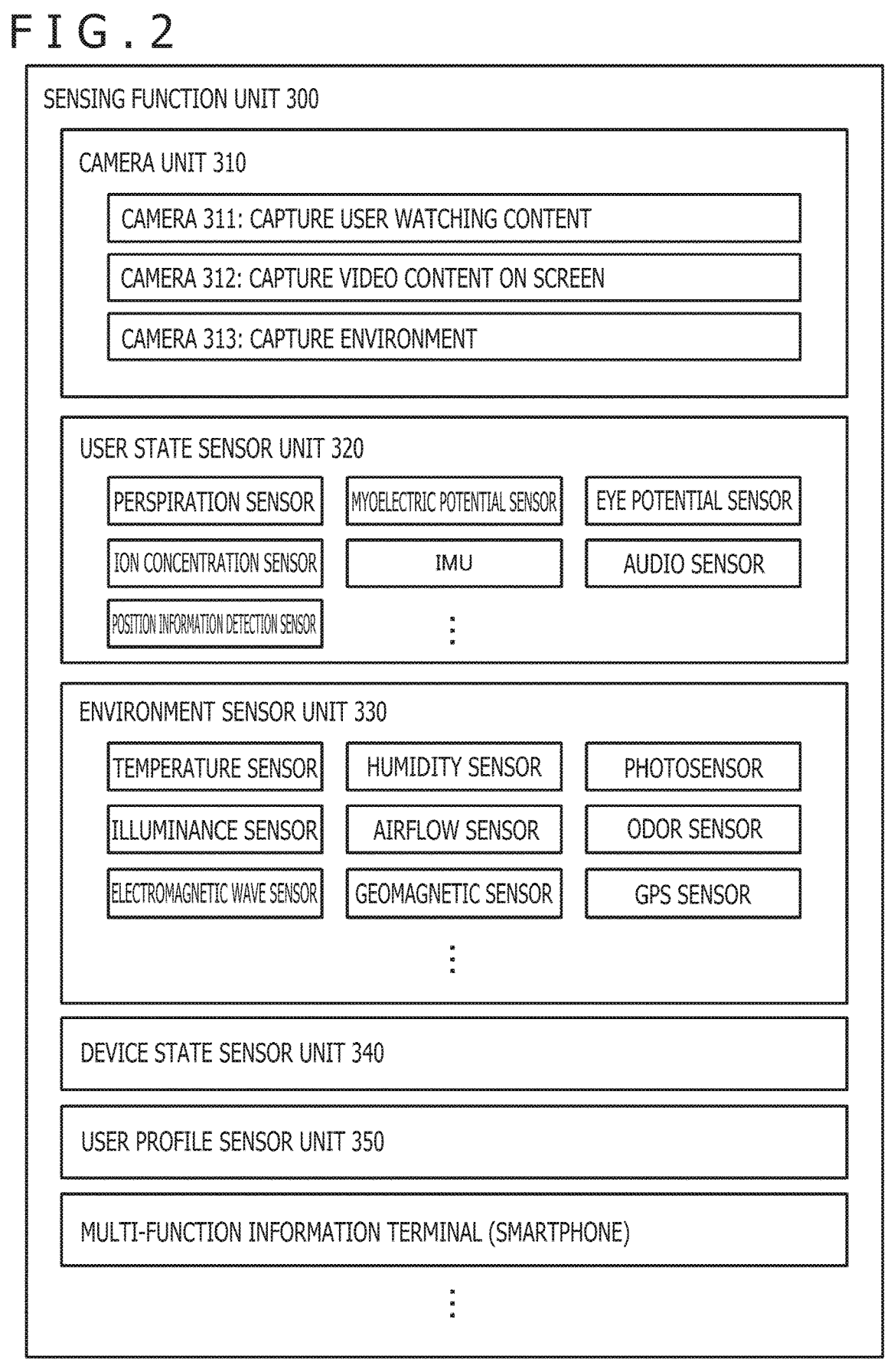

SENSING FUNCTION UNIT 300

CAMERA UNIT 310

CAMERA 311: CAPTURE USER WATCHING CONTENT

CAMERA 312: CAPTURE VIDEO CONTENT ON SCREEN

CAMERA 313: CAPTURE ENVIRONMENT

USER STATE SENSOR UNIT 320

| PERSPIRATION SENSOR | MYOELECTRIC POTENTIAL SENSOR | EYE POTENTIAL SENSOR |
| ION CONCENTRATION SENSOR | IMU | AUDIO SENSOR |
| POSITION INFORMATION DETECTION SENSOR | ⋮ | |

ENVIRONMENT SENSOR UNIT 330

| TEMPERATURE SENSOR | HUMIDITY SENSOR | PHOTOSENSOR |
| ILLUMINANCE SENSOR | AIRFLOW SENSOR | ODOR SENSOR |
| ELECTROMAGNETIC WAVE SENSOR | GEOMAGNETIC SENSOR | GPS SENSOR |

⋮

DEVICE STATE SENSOR UNIT 340

USER PROFILE SENSOR UNIT 350

MULTI-FUNCTION INFORMATION TERMINAL (SMARTPHONE)

⋮

F I G . 3
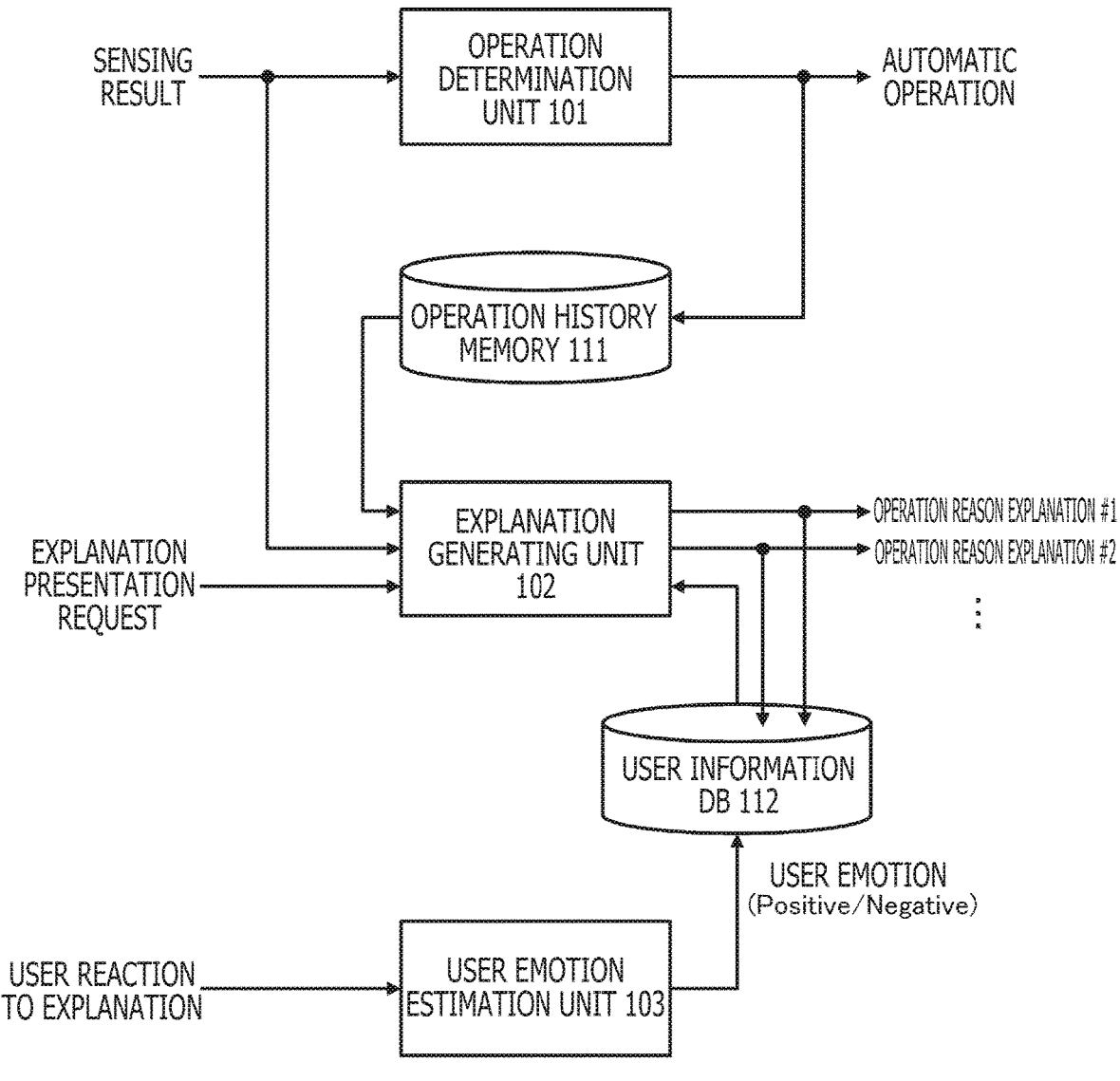

START

S701 — LEARN DATA TRENDS FOR TYPICAL SPEECH
THROUGH LARGE-SCALE DATA

S702 — COLLECT INFORMATION FROM
USAGE LOG OF USER'S DEVICE, ETC.

S703 — RETRAIN MODEL USING COLLECTED INFORMATION

S704 — USE MODEL TO ACTUALLY ESTIMATE

END

801

| TIME | OPERATION HISTORY |
|---|---|
| ▶ 22:30 | AUTOMATIC VOLUME ADJUSTMENT |
| 21:45 | STOPPED RECORDING RECOMMENDED PROGRAM |
| 21:15 | STARTED RECORDING RECOMMENDED PROGRAM |
| 18:00 | AUTOMATIC VOLUME ADJUSTMENT |
| 17:00 | STOPPED POWER-SAVING MODE |
| [SEE MORE OPERATION HISTORY] | |

FIG. 11

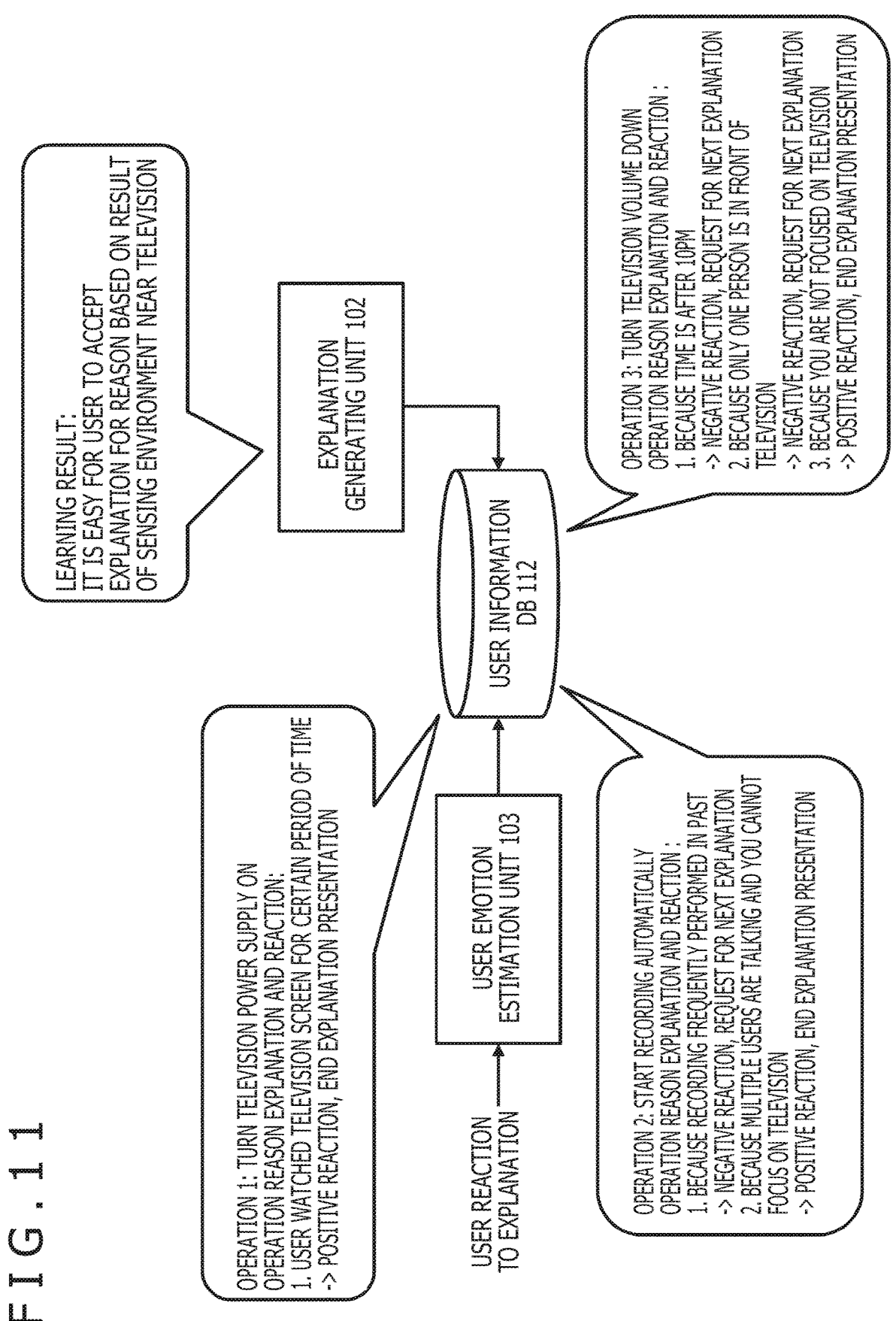

LEARNING RESULT:
IT IS EASY FOR USER TO ACCEPT
EXPLANATION FOR REASON BASED ON RESULT
OF SENSING ENVIRONMENT NEAR TELEVISION

EXPLANATION
GENERATING UNIT 102

USER INFORMATION
DB 112

USER EMOTION
ESTIMATION UNIT 103

USER REACTION
TO EXPLANATION

OPERATION 1: TURN TELEVISION POWER SUPPLY ON
OPERATION REASON EXPLANATION AND REACTION:
1. USER WATCHED TELEVISION SCREEN FOR CERTAIN PERIOD OF TIME
-> POSITIVE REACTION, END EXPLANATION PRESENTATION

OPERATION 2: START RECORDING AUTOMATICALLY
OPERATION REASON EXPLANATION AND REACTION :
1. BECAUSE RECORDING FREQUENTLY PERFORMED IN PAST
-> NEGATIVE REACTION, REQUEST FOR NEXT EXPLANATION
2. BECAUSE MULTIPLE USERS ARE TALKING AND YOU CANNOT
FOCUS ON TELEVISION
-> POSITIVE REACTION, END EXPLANATION PRESENTATION

OPERATION 3: TURN TELEVISION VOLUME DOWN
OPERATION REASON EXPLANATION AND REACTION :
1. BECAUSE TIME IS AFTER 10PM
-> NEGATIVE REACTION, REQUEST FOR NEXT EXPLANATION
2. BECAUSE ONLY ONE PERSON IS IN FRONT OF
TELEVISION
-> NEGATIVE REACTION, REQUEST FOR NEXT EXPLANATION
3. BECAUSE YOU ARE NOT FOCUSED ON TELEVISION
-> POSITIVE REACTION, END EXPLANATION PRESENTATION

F I G . 1 2

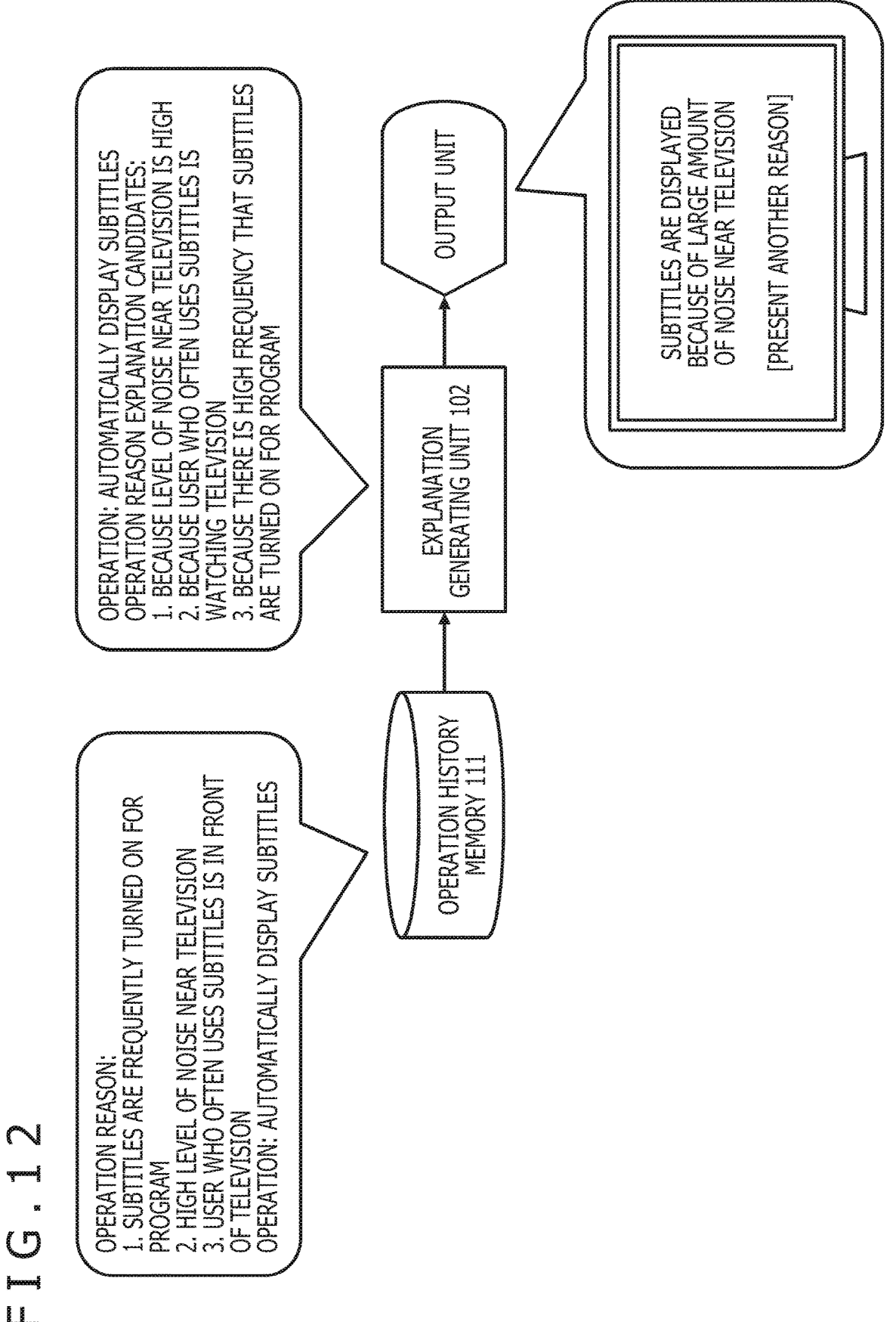

OPERATION: AUTOMATICALLY DISPLAY SUBTITLES
OPERATION REASON EXPLANATION CANDIDATES:
1. BECAUSE LEVEL OF NOISE NEAR TELEVISION IS HIGH
2. BECAUSE USER WHO OFTEN USES SUBTITLES IS WATCHING TELEVISION
3. BECAUSE THERE IS HIGH FREQUENCY THAT SUBTITLES ARE TURNED ON FOR PROGRAM

OUTPUT UNIT

EXPLANATION GENERATING UNIT 102

OPERATION HISTORY MEMORY 111

OPERATION REASON:
1. SUBTITLES ARE FREQUENTLY TURNED ON FOR PROGRAM
2. HIGH LEVEL OF NOISE NEAR TELEVISION
3. USER WHO OFTEN USES SUBTITLES IS IN FRONT OF TELEVISION
OPERATION: AUTOMATICALLY DISPLAY SUBTITLES

SUBTITLES ARE DISPLAYED BECAUSE OF LARGE AMOUNT OF NOISE NEAR TELEVISION

[PRESENT ANOTHER REASON]

F I G . 1 3
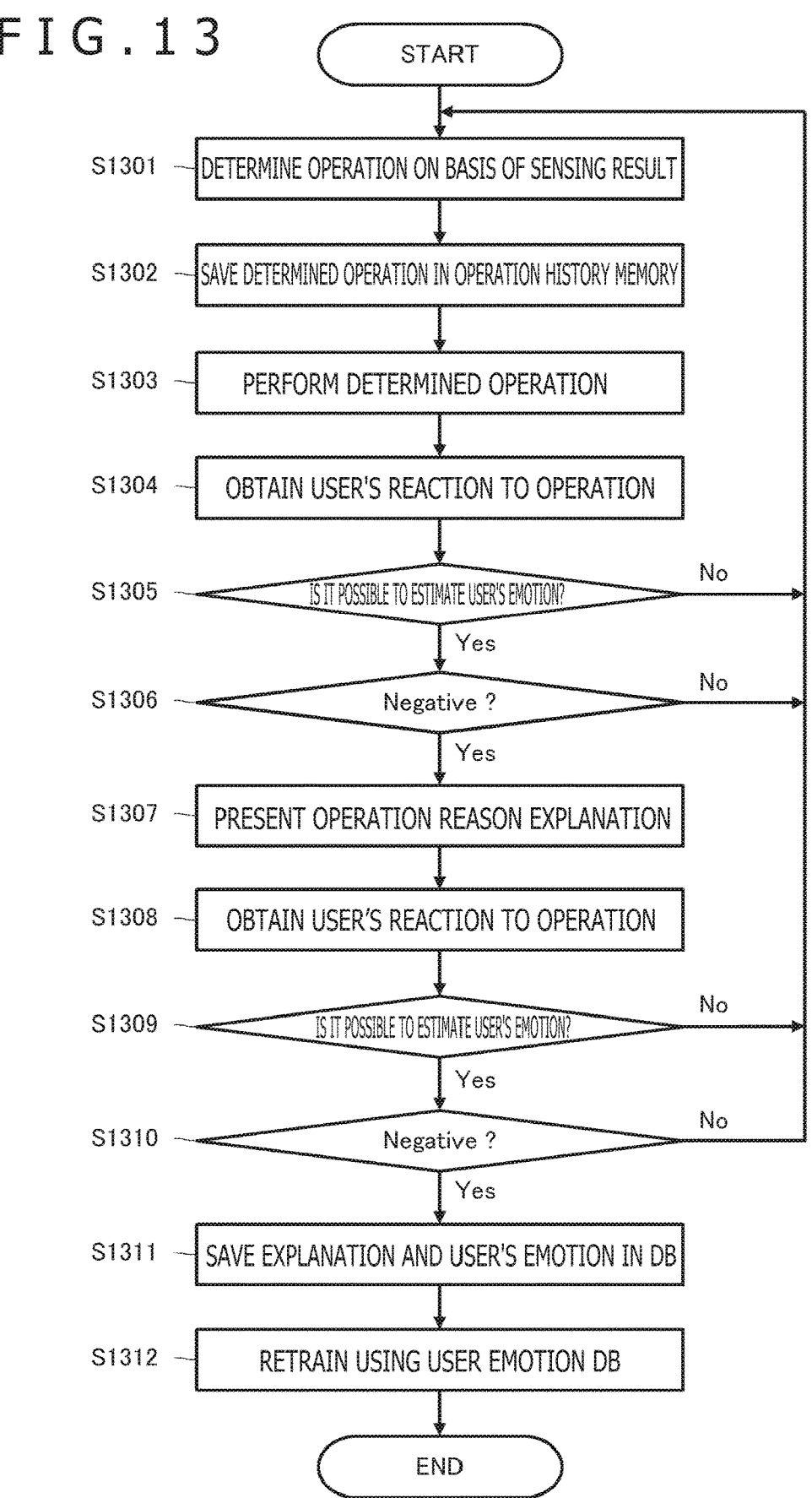

FIG.14

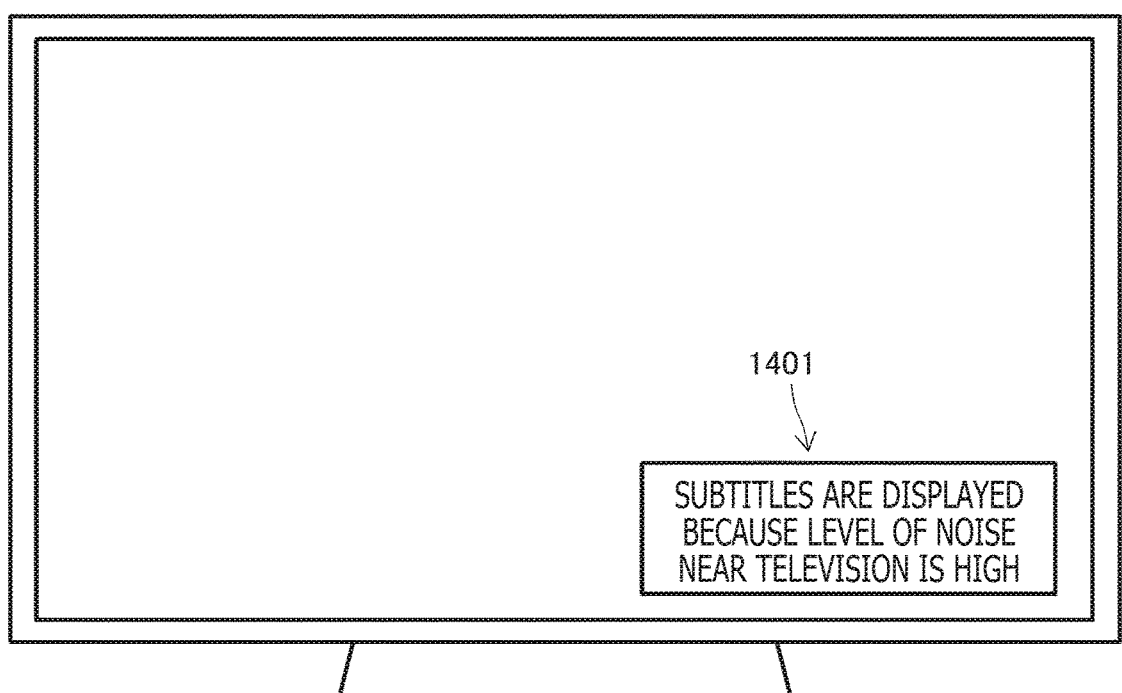

```
                                        1401

SUBTITLES ARE DISPLAYED
              BECAUSE LEVEL OF NOISE
              NEAR TELEVISION IS HIGH
```

FIG.15

SUBTITLES ARE DISPLAYED DUE TO FOLLOWING REASON:     1501
LEVEL OF NOISE NEAR TELEVISION IS HIGH

STOP PROCESSING                1502
              BASED ON REASON

SIMILAR PROCESSING WILL BE PERFORMED IN FOLLOWING CASES:
USER WHO OFTEN USES SUBTITLES IS WATCHING TV          1503
THERE IS PROGRAM FOR WHICH FREQUENCY OF TURNING SUBTITLES ON IS HIGH

INFORMATION PROCESSING DEVICE AND INFORMATION PROCESSING METHOD FOR PRESENTING REACTION-ADAPTIVE EXPLANATION OF AUTOMATIC OPERATIONS

CROSS REFERENCE TO RELATED APPLICATIONS

This application is a U.S. National Phase of International Patent Application No. PCT/JP2021/005122 filed on Feb. 10, 2021, which claims priority benefit of Japanese Patent Application No. JP 2020-070086 filed in the Japan Patent Office on Apr. 8, 2020. Each of the above-referenced applications is hereby incorporated herein by reference in its entirety.

TECHNICAL FIELD

A technique disclosed in the present specification (hereinafter, referred to as "the present disclosure") pertains to an information processing apparatus, an information processing method, and a computer program that perform processing pertaining to an automatic operation of a control-target apparatus.

BACKGROUND ART

Recently, artificial intelligence techniques that use trained neural network models are spreading widely. In particular, a deep learning neural network model provided with multiple neural network layers (hereinafter, may also be referred to as a "DNN") through training, namely, deep learning, extracts, from a large amount of data, features that could not be imagined by a developer, and it is thus possible to develop an artificial intelligence function that can solve complex problems such as an algorithm that cannot be envisioned by the developer (for example, refer to PTL 1). From now on, it is estimated that DNNs will be applied to internal processing by various devices in one's daily life, starting from televisions.

CITATION LIST

Patent Literature

[PTL 1]
Japanese Patent Laid-open No. 2019-82883

SUMMARY

Technical Problem

An objective of the present disclosure is to provide an information processing apparatus, an information processing method, and a computer program that perform processing pertaining to an automatic operation of a control-target apparatus.

Solution to Problem

A first aspect of the present disclosure is an information processing apparatus including a determination unit that determines processing in a control-target apparatus corresponding to sensor information, a generation unit that generates an explanation for a reason for the processing, and an estimation unit that performs an estimation with respect to a reaction from a user, in which the generation unit controls presentation of the explanation on the basis of a result of the estimation with respect to the reaction from the user.

The generation unit controls, on the basis of the result of the estimation, a granularity of information to be presented as the explanation, a method of expressing explanatory text, selection of a device to be used for output of the explanation, or a setting (a text font and a text size in a case of using a screen, and volume and an audio quality in a case of using audio) on the device to be used for the output of the explanation.

The generation unit includes a first machine learning model that has been trained to estimate an explanation for a reason for processing in the control-target apparatus corresponding to the sensor information, and uses the first machine learning model to generate an explanation for the processing. The first machine learning model is retrained on the basis of an explanation presented with respect to processing performed by the control-target apparatus according to the sensor information, and of a reaction from a user.

In addition, the determination unit includes a second machine learning model that has been trained to estimate processing in the control-target apparatus corresponding to the sensor information, and uses the second machine learning model to determine processing in the control-target apparatus corresponding to the sensor information. The second machine learning model is retrained on the basis of processing performed by the control-target apparatus according to the sensor information, and of a reaction from a user.

In addition, a second aspect of the present disclosure is an information processing method including a determination step of determining processing in a control-target apparatus corresponding to sensor information, a generation step of generating an explanation for a reason for the processing, and an estimation step of performing an estimation with respect to a reaction from a user, in which, in the generation step, presentation of the explanation is controlled on the basis of a result of the estimation with respect to the reaction from the user.

Moreover, a third aspect of the present disclosure is a computer program that is written in a computer-readable format and causes a computer to function as a determination unit that determines processing in a control-target apparatus corresponding to sensor information, a generation unit that generates an explanation for a reason for the processing, and an estimation unit that performs an estimation with respect to a reaction from a user, in which the generation unit controls presentation of the explanation on the basis of a result of the estimation with respect to the reaction from the user.

The computer program according to the third aspect of the present disclosure defines a computer program described in a computer-readable format such that predetermined processing is performed on the computer. In other words, by installing the computer program according to the third aspect of the present disclosure into the computer, a collaborative action is exercised on the computer, and it is possible to achieve an effect similar to that of the information processing apparatus according to the first aspect of the present disclosure.

Advantageous Effects of Invention

By virtue of the present disclosure, it is possible to provide an information processing apparatus, an information processing method, and a computer program that perform processing for presenting an explanation for a reason why a control-target apparatus has performed an automatic operation.

Note that effects described in the present specification are purely exemplary, and effects brought about by the present disclosure are not limited thereto. In addition, the present disclosure may also achieve additional effects beyond the effects described above.

Still other objectives, features, or advantages of the present disclosure will clearly be described in more detail on the basis of embodiments to be described later and attached drawings.

BRIEF DESCRIPTION OF DRAWINGS

FIG. 1 is a view that illustrates an example of a configuration of a television reception apparatus 100.

FIG. 2 is a view that illustrates an example of a configuration of a sensing function unit 300 equipped by the television reception apparatus 100.

FIG. 3 is a view that schematically illustrates an example of a functional configuration for performing an automatic operation by the television reception apparatus 100, and performing an optimal operation reason explanation.

FIG. 11 is a view that illustrates an example of the operation of the explanation generating unit 102.

FIG. 12 is a view that illustrates an example of the operation of the explanation generating unit 102.

FIG. 13 is a flow chart that illustrates an overall processing procedure for the television reception apparatus 100 to automate an operation and give an operation reason explanation.

FIG. 14 is a view that illustrates an example of a configuration of a screen for presenting an operation reason explanation.

FIG. 15 is a view that illustrates an example of a configuration of a screen for setting learning contents for retraining.

DESCRIPTION OF EMBODIMENTS

Figure 4:
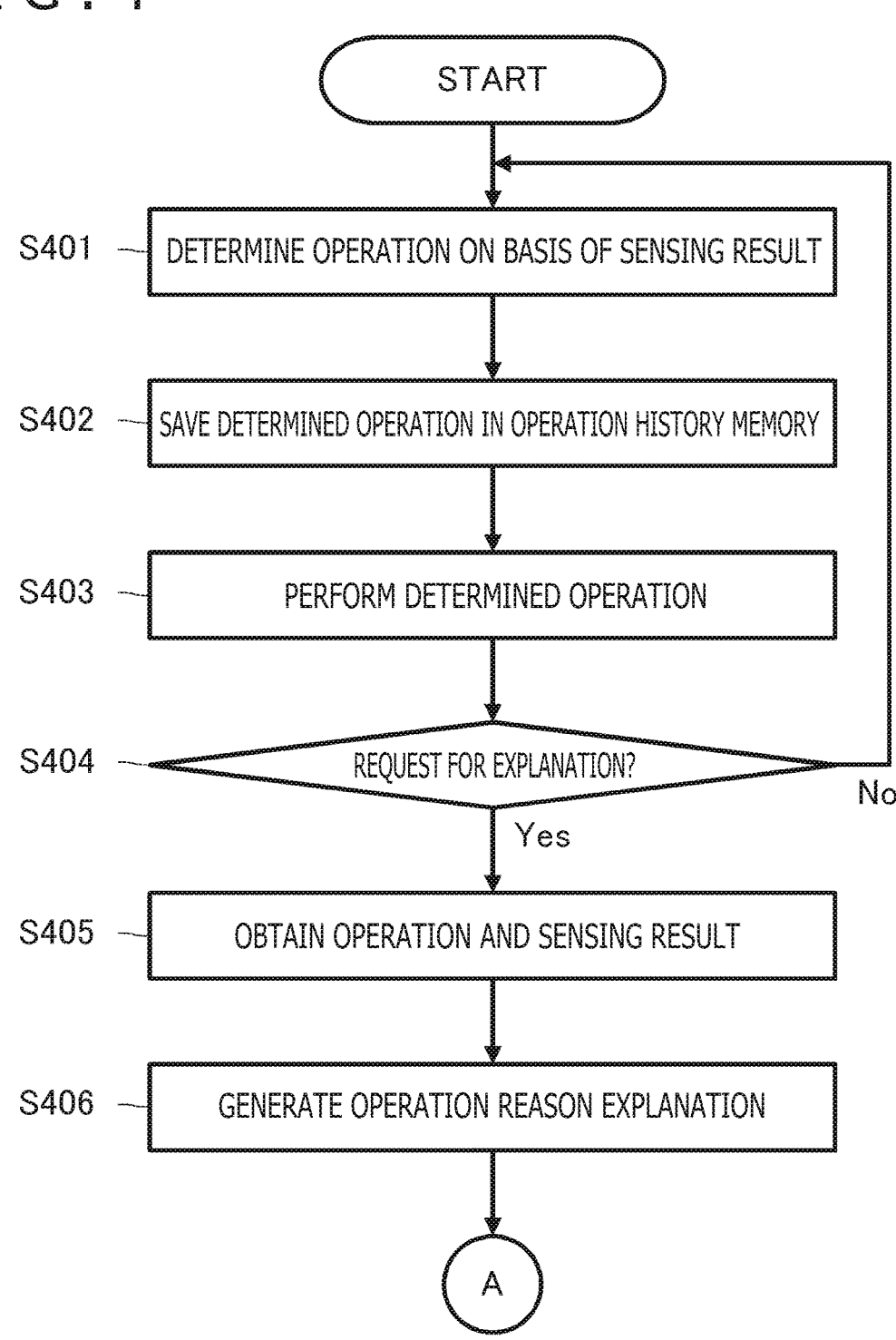
FIG. 4 is a flow chart that illustrates a processing procedure (first half) for performing an automatic operation by the television reception apparatus 100, and performing an optimal operation reason explanation.

With reference to the drawings, description is given below in the following order, regarding the present disclosure.
A. Outline
B. Apparatus configuration
C. Sensing function
D. Automation of internal processing and explanation of operation reason
E. Functional configuration
F. Processing operation
G. Example of realizing operation reason explanation
H. Example of realizing voice input from user for emotion estimation
I. Operation for presenting operation reason explanation
J. Learning that includes determining an operation
K. Presentation of an explanation using another device
L. Example of application to other devices A. Outline It is estimated that, in the near future, a DNN will be applied to internal processing by various devices in one's daily life, starting with televisions, and devices will automatically operate on the basis of an inference result by the DNN. However, there is concern that, when a user views an operation that a device has automatically performed according to its own determination, the user may not be able to understand the reason why that operation has been performed.

For example, an inference apparatus that presents a user with a result of putting, into words, something representative from among internal feature amounts in a DNN and visualizing the words has been proposed (refer to PTL 1). In a case of solving a clustering problem by a neural network (hereinafter also referred to as an "NN"), this inference apparatus obtains a "ground feature amount" shared by "frequently-appearing feature amounts" for each class and "representative feature amounts" from among NN inputs, and associates the ground feature amount with an overview to thereby output a feature amount which is a ground for an inference. For example, an explanation for a reason why an image clustering NN has determined an input image to be of a garbage truck is "This image is of a garbage truck. This is because a fine pattern that combines tire or object edges and a quadrilateral and a fine jagged pattern are included."

This inference apparatus describes feature amounts that are grounds for a DNN operation, but is not configured to infer whether the contents thereof are easy for a user to understand. In addition, in a case where this inference apparatus is mounted to an apparatus that performs internal processing to which a DNN is applied and where presentation of an operation reason is caused to be performed, multiple DNNs operate in combination, and it is predicted that complex processing will be performed. Accordingly, there is a possibility that explanatory text for the operation reason will be long and complicated. In addition, explanatory text presented by using this inference apparatus is created by putting internal feature amounts from the DNN into words and joining the words together simply. Accordingly, even if there is a correct explanation for a DNN operation reason, sufficient consideration has not been made as to whether the contents thereof are easy to understand for a typical user.

From the perspective of a device to which a DNN has been mounted and which explains a reason for an automatic operation made by itself, it is necessary that explanatory text be easily understood by a typical user (or an individual user). Accordingly, the present disclosure proposes an apparatus resulting from combining, with an operation determination unit that automatically determines an operation for a target device, an explanation generating unit that generates explanatory text for explaining to a user a reason for the operation determined by the operation determination unit. The explanation generating unit obtains information regarding what kind of operation performed by a target device the user is requiring an explanation for or what kind of reaction the user has with respect to an operation reason explanation presented to the user, whereby the explanation generating unit learns an optimal method of generating explanatory text for an operation reason and an optimal method of presenting an explanation. The explanation generating unit can also learn, for each user, an optimal method of generating explanatory text for an operation reason and an optimal method of presenting an explanation. Accordingly, by combining such an explanation generating unit with the operation determination unit that automatically determines an operation for a target device, it becomes possible to present a reason for performing an automatic operation by a device, in such a manner that the reason is concise and easy for a user to understand and in a form adapted for the user.

B. Apparatus Configuration

In this section, description is given regarding a television reception apparatus to which the present disclosure is applied. FIG. 1 illustrates an example of a configuration of a television reception apparatus 100 to which the present disclosure is applied. The television reception apparatus 100 is provided with a main control unit 201, a bus 202, a storage unit 203, a communication interface (IF) unit 204, an expansion interface (IF) unit 205, a tuner/demodulation unit 206, a demultiplexer (DEMUX) 207, a video decoder 208, an audio decoder 209, a text superimposition decoder 210, a subtitle decoder 211, a subtitle processing unit 212, a data decoder 213, a cache unit 214, an application (AP) control unit 215, a browser unit 216, a sound source unit 217, a video processing unit 218, a display unit 219, an audio processing unit 220, an audio output unit 221, and an operation input unit 222.

The main control unit 201 includes, for example, a controller, a ROM (Read Only Memory) (note that the ROM includes a rewritable ROM as with an EEPROM (Electrically Erasable Programmable ROM)), and a RAM (Random Access Memory), and comprehensively controls the operation of television reception apparatus 100 as a whole according to a predetermined operation program. The controller includes a processor chip such as a CPU (Central Processing Unit) or an MPU (Micro Processing Unit). Alternatively, the main control unit 201 may be a processor having multiple processor cores, such as a GPU (Graphics Processing Unit) or a GPGPU (General Purpose Graphic Processing Unit).

The ROM is a non-volatile memory that stores a basic operation program such as an operating system (OS) or another operation program. An operation setting value necessary for the operation of the television reception apparatus 100 may be stored in the ROM. The RAM is a work area used when the OS or another operation program is executed. The bus 202 is a data communication channel for transmitting and receiving data between the main control unit 201 and each unit in the television reception apparatus 100.

In the present disclosure, a trained DNN model is used in the main control unit 201 to perform various inferences related to internal processing in the television reception apparatus 100. Internal processing that uses a trained DNN model includes determining an operation related to an automatic operation of the television reception apparatus 100, generating explanatory text for the user related to the determined operation and determining a method of outputting the explanatory text, estimating a user reaction or emotion with respect to the outputted explanation, etc. The details of internal processing that uses a DNN model will be described below. In addition, in the main control unit 201, it is also possible to retrain a trained DNN model. Examples of such an operation related to an automatic operation of the television reception apparatus 100 include switching of image modes (cinema mode or game mode), switching of luminance dynamic ranges (SDR or HDR, LDR) or gamma correction, switching of luminance, switching of resolutions (up-conversion control), screen size control (overscan, underscan, dot-by-dot, etc.) (for an external input), display control (position, color, size, etc.) for a UI (User Interface), switching of channels, a volume adjustment, audio output direction control, switching of subtitle display, switching of languages, accessibility control, switching of input, application trajectory control, screen orientation control (in the case of a swing television, etc.), screen rotation control (in the case of a screen rotating display, etc.), and screen exposure control (in the case of a rollable display, etc.).

The storage unit 203 includes a non-volatile storage device such as a flash ROM, an SSD (Solid State Drive), or an HDD (Hard Disk Drive). The storage unit 203 stores an operation program or an operation setting value for the television reception apparatus 100, personal information for a user who uses the television reception apparatus 100, etc. In addition, the storage unit 203 stores an operation program downloaded via the internet, various types of data created by this operation program, etc. The storage unit 203 can also store such content as videos, still images, and audio obtained via a broadcast wave or the internet. In addition, the storage unit 203 stores a weighting coefficient for the coupling between nodes in a trained DNN model (described above).

The communication interface unit 204 is connected to the internet via a router (not illustrated), etc., and transmits and receives data to and from various server apparatuses which are on the internet or another communication device. In addition, it also obtains a data stream for a program that is communicated via a communication line. The router may be for either a wired connection such as Ethernet (registered trademark) or a wireless connection such as Wi-Fi (registered trademark).

The tuner/demodulation unit 206 receives a broadcast wave such as a terrestrial broadcast or a satellite broadcast via an antenna (not illustrated), and, on the basis of control by the main control unit 201, tunes to (channel selection) a channel for service (broadcast station, etc.) desired by a user. In addition, the tuner/demodulation unit 206 demodulates a received broadcast signal to thereby obtain a broadcast data stream. Note that, in order to perform simultaneous display on multiple screens or record a program on another channel, there may be employed a configuration in which the television reception apparatus 100 is mounted with multiple tuner/demodulation units (in other words, multiple tuners).

On the basis of a control signal included in an data stream received as input, the demultiplexer 207 respectively distributes a video data stream which is a real-time presentation element, an audio data stream, a text superimposition data stream, a subtitle data stream to the video decoder 208, the audio decoder 209, the text superimposition decoder 210, and the subtitle decoder 211. A data stream inputted to the demultiplexer 207 includes a broadcast data stream from a broadcast service and a distributed data stream from a distribution service that uses a network, such as IPTV (Internet Protocol TV), OTT (Over-The-Top), or a video sharing site. The broadcast data stream is inputted to the demultiplexer 207 after being subjected to channel selection reception and demodulation by the tuner/demodulation unit 206, and the distributed data stream is inputted to the demultiplexer 207 after being received by the communication interface unit 204. In addition, the demultiplexer 207 reproduces a multimedia application or file-based data which is a component of the application, and outputs the multimedia application or file-based data to the application control unit 215 or temporarily accumulates the multimedia application or file-based data in the cache unit 214.

The video decoder 208 decodes a video stream received from the demultiplexer 207 and outputs video information. In addition, the audio decoder 209 decodes an audio stream received from the demultiplexer 207 and outputs audio information. In digital broadcasting, a video stream and an audio stream that are individually encoded according to, for example, an MPEG2 System standard are multiplexed and transmitted or distributed. The video decoder 208 and the audio decoder 209 perform a decoding process according to the respective decoding methods that are standardized, on the encoded video stream and the encoded video stream which have been demultiplexed by the demultiplexer 207. Note that, in order to simultaneously decode and process multiple types of video data streams and audio data streams, the television reception apparatus 100 may be provided with multiple video decoders 208 and audio decoders 209.

The text superimposition decoder 210 decodes a text superimposition data stream received from the demultiplexer 207 and outputs text superimposition information. The subtitle decoder 211 decodes a subtitle data stream received from the demultiplexer 207 and outputs subtitle information. The subtitle processing unit 212 performs processing for combining the text superimposition information received from the text superimposition decoder 210 and the subtitle information received from the subtitle decoder 211.

The data decoder 213 decodes a data stream multiplexed in an MPEG-2 TS stream together with a video and audio. For example, the data decoder 213 notifies the main control unit 201 of a result of decoding a generic event message stored in a descriptor region in a PMT (Program Map Table) which is one type of a PSI (Program Specific Information) table.

The application control unit 215 receive, from the demultiplexer 207, control information included in a broadcast data stream or obtains control information from a server apparatus on the internet via the communication interface unit 204, and interprets these items of control information.

The browser unit 216 presents, according to an instruction from the application control unit 215, a multimedia application file or file-based data which is a component of the file, the multimedia application file being obtained from the cache unit 214 or from a server apparatus on the internet via the communication interface unit 204. A multimedia application file referred to here is, for example, an HTML (Hyper Text Markup Language) document, a BML (Broadcast Markup Language) document, etc. In addition, the browser unit 216 works with the sound source unit 217 to thereby reproduce audio information for the application.

The video processing unit 218 receives the video information outputted from the video decoder 208, the subtitle information outputted from the subtitle processing unit 212, and the application information outputted from the browser unit 216, and performs processing to, as appropriate, make a selection from or superimpose these pieces of information. The video processing unit 218 is provided with a video RAM (illustration omitted), and display driving for the display unit 219 is performed on the basis of the video information inputted to this video RAM. In addition, on the basis of control by the main control unit 201, the video processing unit 218 performs superimposition processing for screen information such as an EPG (Electronic Program Guide) screen, graphics generated by an application executed by the main control unit 201, etc., as necessary. Moreover, the video processing unit 218 performs video signal processing including noise reduction, resolution conversion processing such as super resolution, dynamic range conversion processing, and gamma processing.

The display unit 219 is, for example, a display device that includes a liquid crystal display, an organic EL (Electro-Luminescence) display, etc., and presents a user with video information that has been selected by the video processing unit 218 or has undergone the superimposition processing by the video processing unit 218.

The audio processing unit 220 receives the audio information outputted from the audio decoder 209 and the application audio information reproduced by the sound source unit 217, and performs such processing as making a selection or combining information, as appropriate. In addition, the audio processing unit 220 may perform processing to improve audio quality by performing band expansion on a low-resolution or standard-resolution audio signal to a high-resolution audio signal including a band that has been removed or compressed. Further, the audio processing unit 220 may also perform sound image localization processing using multiple speakers.

The audio output unit 221 is used for audio output of program content subjected to channel selection reception by the tuner/demodulation unit 206 or data broadcast content, and output of audio information (includes audio guidance, synthesized speech by a voice agent, etc.) processed by the audio processing unit 220. The audio output unit 221 includes a sound generation element such as a speaker. For example, the audio output unit 221 may be a speaker array (a multichannel speaker or an ultra-multichannel speaker) that combines multiple speakers, and some or all of the speakers may externally be connected to the television reception apparatus 100.

The operation input unit 222 is an instruction input unit by which a user inputs an operation instruction to the television reception apparatus 100. The operation input unit 222 includes, for example, a remote controller reception unit that receives a command transmitted from a remote controller (not illustrated) and operation keys arrayed with button switches. In addition, the operation input unit 222 may include a touch panel that is overlapped with the screen of the display unit 219. Also, the operation input unit 222 may include an external input device such as a keyboard connected to the expansion interface unit 205.

The expansion interface unit 205 is an interface group for expanding functionality of the television reception apparatus 100, and includes, for example, an analog video/audio interface, a USB (Universal Serial Bus) interface, a memory interface, etc. The expansion interface unit 205 may include a digital interface that includes a DVI terminal, an HDMI (registered trademark) terminal, a Display Port (registered trademark) terminal, etc.

The expansion interface unit 205 is used as an interface for taking in sensor signals from various sensors included in a sensor group (described below; refer to FIG. 2). The sensors are assumed to include both sensors equipped inside the main body of the television reception apparatus 100 and sensors externally connected to the television reception apparatus 100. Externally connected sensors also includes sensors incorporated in other CE (Consumer Electronics) devices or IoT (Internet of Things) devices that are present in the same space as the television reception apparatus 100. The expansion interface unit 205 may take in a sensor signal that has been subjected to signal processing such as noise removal and then subjected to a digital conversion, or may take in a sensor signal as unprocessed RAW data (an analog waveform signal).

C. Sensing Function

FIG. 2 schematically illustrates an example of a configuration of a sensing function unit 300 equipped by the television reception apparatus 100. The sensors illustrated in FIG. 2 are assumed to include both sensors equipped inside the main body of the television reception apparatus 100 and sensors externally connected to the television reception apparatus 100. A sensor signal from each sensor is taken into the television reception apparatus 100 via the expansion interface unit 205, for example. In addition, at least some of sensors included in the sensing function unit 300 may be provided in the remote controller. At least some sensor signals are inputted to a trained DNN model which is used in the main control unit 201.

A camera unit 310 may include a camera 311 that captures a user who is viewing video content displayed by the display unit 219, a camera 312 that captures video content displayed by the display unit 219, and a camera 313 that captures the inside of a room (or installation environment) in which the television reception apparatus 100 is installed, or may include a camera having multiple functions from among functions held by the cameras 311 through 313.

The camera 311 is, for example, installed near the center of the upper edge of the screen of the display unit 219, and desirably captures a user who is viewing video content. The camera 312 is, for example, installed facing the screen of the display unit 219, and captures video content that the user is viewing. Alternatively, the user may wear goggles equipped with the camera 312. In addition, the camera 312 may be provided with a function to also record (audio recording) the audio of the video content. Further, the camera 313 includes, for example, an omnidirectional camera or a wide-angle camera, and captures the inside of the room (or installation environment) in which the television reception apparatus 100 is installed. Alternatively, the camera 313 may be a camera that is mounted on a camera table (camera platform) that is capable of being rotationally driven around each of axes for roll, pitch, and yaw, for example.

A user state sensor unit 320 includes one or more sensors for obtaining state information regarding a state of a user. It is intended that the user state sensor unit 320 obtains, as state information, for example, a user work state (whether or not the user is viewing video content), a user behavioral state (a mobile state such as stationary, walking, or running, an eyelid open/closed state, a line-of-sight direction, a pupil size), a mental state (a level of emotional engagement such as whether the user is engrossed in or concentrating on the video content, a level of excitement, a level of wakefulness, an emotion, affect, etc.), and also a physiological state. The user state sensor unit 320 may be provided with various sensors such as a perspiration sensor, a myoelectric potential sensor, an eye potential sensor, an electroencephalography sensor, an exhalation sensor, a gas sensor, an ion concentration sensor, or an IMU (Inertial Measurement Unit) that measures user behavior, and may be provided with an audio sensor (such as a microphone) that picks up user utterances and a position information detection sensor (such as a proximity sensor) that detects the position of an object such as a user's finger. Note that the microphone does not necessarily need to be integrated with the television reception apparatus 100, and may be mounted on a product that is situated in front of a television, such as a soundbar. In addition, an external microphone-equipped device that is connected by wire or wirelessly may be used. An external microphone-equipped device may be a smart speaker, wireless headphones/headset, a tablet, a smartphone, a PC (personal Computer), a refrigerator, a washing machine, an air conditioner, a vacuum cleaner, what is called a smart appliance such as an illumination fitting, an IoT appliance apparatus, or a robot, which are equipped with a microphone and are capable of audio input. The position information detection sensor may be configured as a touch sensor for detecting an operation made by a user on the display unit 219.

An environment sensor unit 330 includes various sensors for measuring information regarding an environment such as the inside of the room that the television reception apparatus 100 is installed. For example, the environment sensor unit 330 includes a temperature sensor, a humidity sensor, a photosensor, a illuminance sensor, an airflow sensor, an odor sensor, an electromagnetic wave sensor, a geomagnetic sensor, a GPS (Global Positioning System) sensor, an audio sensor (such as a microphone) that picks up surrounding sounds, etc. In addition, the environment sensor unit 330 may obtain such information as the size of a room in which the television reception apparatus 100 is placed, a position of a user, or the brightness of the room.

A device state sensor unit 340 includes one or more sensors for obtaining a state inside the television reception raw apparatus 100. Alternatively, a circuit component such as the video decoder 208 or the audio decoder 209 may be provided with a function for externally outputting a state of an input signal, a processing status of an input signal, etc., to fulfill a role as a sensor that detects a state inside a device. In addition, the device state sensor unit 340 may detect an operation performed by a user with respect to the television reception apparatus 100 or another device, or save a past operation history for a user. An operation made by a user may include a remote control operation with respect to the television reception apparatus 100 or the other device. The other device referred to here may be a tablet, a smartphone, a PC, a refrigerator, a washing machine, an air conditioner, a vacuum cleaner, what is called a smart appliance such as an illumination fitting, an IoT appliance apparatus, or a robot. In addition, the device state sensor unit 340 may obtain information regarding device performance or specifications. The device state sensor unit 340 may be a memory such as a built-in ROM in which the information regarding the device performance or specifications is recorded, or may be a reader that reads out information from such a memory.

A user profile sensor unit 350 detects profile information regarding a user who views video content at the television reception apparatus 100. The user profile sensor unit 350 may not necessarily need to include a sensor element. For example, a user profile such as a user age or gender may be estimated on the basis of a user face image captured by the camera 311, an utterance of the user that is picked up by an audio sensor, etc. In addition, a user profile obtained on a multi-function information terminal carried by a user, such as a smartphone, or a user profile that a smart speaker or a robot obtains through a dialogue with the user may be obtained through cooperation between devices such as the television reception apparatus 100 and the smartphone. However, it is not necessary for the user profile sensor unit 350 to detect sensitive information such as that related to user privacy or confidentiality. Further, there is no need to detect the same user profile each time video content is viewed, and the user profile sensor unit 350 may be such a memory as an EEPROM that saves user profile information that has been obtained once.

In addition, a multi-function information terminal such as a smartphone carried by a user may be used as the camera unit 310, the user state sensor unit 320, the environment sensor unit 330, or the user profile sensor unit 350, through cooperation between devices such as the television reception apparatus 100 and the smartphone, etc. For example, sensor information obtained by a sensor incorporated in the smartphone or data managed by an application such as a healthcare function (pedometer, etc.), a calendar, a schedule book, a notebook, an email, a browser history, and SNS (Social Network Service) posts and viewing history may be added to user state data or environment data. Further, a sensor incorporated in another CE device or IoT device present in the same space as the television reception apparatus 100 may be used as the user state sensor unit 320 or the environment sensor unit 330. In addition, the sound of an intercom may be detected, or a visitor may be detected by communication with an intercom system. Also, a luminance meter or a spectrum analysis unit that obtains and analyzes a video or audio outputted from the television reception apparatus 100 may be provided as a sensor.

D. Automation of Internal Processing and Explanation of Operation Reason

In the present embodiment, it is envisioned that a DNN is applied to almost all of the internal processing in the television reception apparatus 100 and that an automatic operation can be performed by the television reception apparatus 100 on the basis of the user's usage situation or surrounding environment which has sensed by the sensing function described in section C above. Specifically, an operation of the main body of the television reception apparatus 100, such as a channel operation, a volume adjustment, an image quality adjustment, or a subtitle setting, is intended to be automated by using the DNN, but a collaborative operation between the television reception apparatus 100 and an external device connected thereto, such as an automatic recording setting or audio output to an external speaker, can also be automated by using the DNN.

An automatic operation is performed by the television reception apparatus 100 on the basis of an inference result from the DNN, whereby a user does not need to perform a manual operation, which is convenient. However, even with an operation that is automatically performed by the television reception apparatus 100 or the DNN at discretion thereof, there may be a case where, seen from the user, a reason why the operation has been performed cannot be understood.

For example, in a case where the current time is after 10 PM, where there is one user in front of the television reception apparatus 100, and where the user is not watching the television, an automatic operation such as turning the volume down is performed after inferring that a program that fits the user's preferences is not being broadcast. The user may not understand the reason why such an automatic operation is performed, making the user uncomfortable.

In the present disclosure, the television reception apparatus 100 itself explains the reason for an automatic operation at the television reception apparatus 100, which is equipped with a DNN. Accordingly, the user can query the television reception apparatus 100 as to what has occurred. In addition, through interaction with the user, the television reception apparatus 100 can learn what kind of explanation to give to facilitate getting the user to understand the reason for the automatic operation, and realize presentation of a concise reason to the user.

E. Functional Configuration

FIG. 3 schematically illustrates an example of a functional configuration for performing an automatic operation by the television reception apparatus 100, and performing an optimal operation reason explanation. In order to realize this functionality, the television reception apparatus 100 is provided with an operation determination unit 101, an explanation generating unit 102, and a user emotion estimation unit 103. In addition, as means for storing or accumulating information necessary to realize this functionality, the television reception apparatus 100 is provided with an operation history memory 111 and a user information database 112. The operation determination unit 101, the explanation generating unit 102, and the user emotion estimation unit 103 are, for example, software modules executed by the main control unit 201. However, at least of the operation determination unit 101, the explanation generating unit 102, and the user emotion estimation unit 103 may operate on an information processing apparatus (not illustrated) externally connected to the television reception apparatus 100 via the expansion interface unit 205. In addition, a storage region necessary for the operation history memory 111 and the user information database 112 is secured within the storage unit 203, for example, but may also be secured in a storage apparatus (not illustrated) externally connected to the television reception apparatus 100 via the expansion interface unit 205.

The operation determination unit 101, the explanation generating unit 102, and the user emotion estimation unit 103 are each configured using a trained DNN model that has been subjected to deep learning. Needless to say, one trained DNN model can be used to configure the operation determination unit 101, the explanation generating unit 102, and the user emotion estimation unit 103, but in the present specification, for the purpose of convenience, the operation determination unit 101, the explanation generating unit 102, and the user emotion estimation unit 103 are each explained as an independent functional module. It is envisioned that deep learning for these DNN models is performed in a cloud and that a trained DNN model is equipped in each product, that is, in the television reception apparatus 100. Needless to say, it is also possible to perform deep learning of a DNN model in the television reception apparatus 100.

The operation determination unit 101 determines an operation for the television reception apparatus 100 on the basis of a result of sensing the state of a user or the surrounding environment by the sensing function unit 300 (refer to FIG. 2). In the present embodiment, the operation determination unit 101 is provided with a trained DNN that has performed deep learning on the correlation between sensing information regarding a user state (usage situation of the television reception apparatus 100 by the user) or surrounding environment (current time, room brightness, room temperature, etc.) and an operation performed by the television reception apparatus 100. The operation determination unit 101 then uses an inference made by the trained DNN to determine an operation for the television reception apparatus 100 on the basis of a sensing result received as input from the sensing function unit 300. The main control unit 201 sends a control signal for performing the operation determined by the operation determination unit 101 to a corresponding functional module inside the television reception apparatus 100, and performs an automatic operation. In addition, the operation that has been determined by the operation determination unit 101 and automatically been executed by the television reception apparatus 100 is saved in the operation history memory 111. The operation history memory 11 saves the operation automatically executed by the television reception apparatus 100 together with the time at which the operation was executed. Note that the operation determination unit 101 may save an inference history attained in the determination of the operation based on a sensing result, in the operation history memory 111 together with the determined operation.

Note that a sensing result by the sensing function unit 300 that is inputted to the operation determination unit 101 may include, in addition to the usage situation of the television reception apparatus 100 by a user or surrounding environment, a history of an operation made by the user on the television reception apparatus 100 or another device, an operation history of the television reception apparatus 100 or another device, user profile information obtained by the user profile sensor unit 350, etc.

In addition, examples of an operation of the television reception apparatus 100 determined by the operation determination unit 101 on the basis of the sensing result, include switching of image modes (cinema mode or game mode), switching of luminance dynamic ranges (SDR or HDR, LDR) or gamma correction, switching of luminance, switching of resolutions (up-conversion control), screen size control (overscan, underscan, dot-by-dot, etc.) (for an external input), display control (position, color, size, etc.) for a UI, switching of channels, a volume adjustment, audio output direction control, switching of subtitle display, switching of languages, accessibility control, switching of input, application trajectory control, screen orientation control (in the case of a swing television, etc.), screen rotation control (in the case of a screen rotating display, etc.), and screen exposure control (in the case of a rollable display, etc.). However, there is no need for the operation determination unit 101 to determine all of these operations, and there are cases where it is sufficient if the operation determination unit 101 determines some operations from among the above, such as a volume adjustment or subtitle display.

In a case where there is a request for presentation of an explanation from a user, the explanation generating unit 102 generates an explanation for a reason for the operation performed by the television reception apparatus 100, which has been determined by the operation determination unit 101, in such a manner that the explanation will favorably be accepted (or easily be accepted) by the user. In the present embodiment, the explanation generating unit 102 is provided with a trained DNN that has performed deep learning on the correlation between an operation performed by the television reception apparatus 100 and the user's reaction to an operation reason explanation presented at that time. The user's reaction may be binary, such as whether or not the user likes the presented operation reason explanation (positive/negative), or may be represented by an identification value that is more finely classified. In addition, this trained DNN may further perform deep learning while taking into consideration the correlation between the user's state or the surrounding environment and sensing information. From the sensing result received from the sensing function unit 300 and the operation determined by the operation determination unit 101 and performed by the television reception apparatus 100, the explanation generating unit 102 uses an inference made by the trained DNN to generate an operation reason explanation for the operation performed by the television reception apparatus 100, in such a manner that the explanation will favorably be accepted by the user. The sensing result inputted from the sensing function unit 300 includes user profile information sensed by the user profile sensor unit 350, a device usage history of the user, etc.

The explanation generating unit 102 generates an explanation for the reason for the operation performed by the television reception apparatus 100, for which an explanation has been requested by the user, in such a format that the explanation is estimated to be most accepted by the user. In a case where multiple operation reason explanations are estimated, the explanation generating unit 102 determines which of these should be presented to the user (or an order of priority in which to present). In addition, the explanation generating unit 102 may also determine a format in which to output the generated operation reason, or a method of presenting the generated operation reason to the user. For example, whether to output the operation reason explanation by one of or both audio and a screen is determined. In a case of giving the operation reason explanation by audio, the volume or audio quality may also be determined.

The explanation generating unit 102 saves the operation performed by the television reception apparatus 100, for which presentation of an explanation was requested, and the operation reason explanation that was generated (or presented to the user) at that time, in the user information database 112.

Note that a request for presentation of an explanation from a user to the explanation generating unit 102 may be made by the user using a voice command or a gesture. In addition, the user may make a request for presentation of an explanation to the television reception apparatus 100 via the operation input unit 222 or a remote control operation.

The user emotion estimation unit 103 receives a reaction made by the user when the operation reason explanation generated by the explanation generating unit 102 is presented, and estimates the user's emotion. The user's reaction may be inputted to the user emotion estimation unit 103 using a voice command or a gesture by the user, or may be inputted via the operation input unit 222 or a remote control operation. Alternatively, the user emotion estimation unit 103 may receive the user's reaction as sensing information from the user state sensor unit 320, instead of an explicit operation made by the user, such as speech, a gesture, or an input operation. The user's emotion may be binary, such as whether or not the user likes the presented operation reason (positive/negative), or may be represented by an identification value that is more finely classified. In the present embodiment, the user emotion estimation unit 103 is provided with a trained DNN that has performed deep learning on the correlation between speech, a gesture, an operation input, or the like by the user and the user's reaction. The user emotion estimation unit 103 receives a reaction made by the user when the operation reason explanation generated by the explanation generating unit 102 is presented, and uses an inference made by the trained DNN to estimate the user's emotion.

In addition, the user emotion estimation unit 103 saves the user's emotion expressed when the operation reason explanation generated by the explanation generating unit 102 is presented, in the user information database 112 in association with the operation performed by the television reception apparatus 100 and the operation reason explanation therefor.

The user information database 112 accumulates information including, as a pair, "how to present the operation reason" when the television reception apparatus 100 performs an automatic operation and the "user's emotion" held by the user in relation thereto. The information accumulated in the user information database 112 is used to retrain the trained DNN used in the explanation generating unit 102. Through retraining, the explanation generating unit 102 is personalized such that it becomes easier to generate such an operation reason explanation that an individual user who uses the television reception apparatus 100 will favorably accept, and such that it becomes more difficult to present the individual user with an explanation that inflicts discomfort. For example, in a case of presenting an operation reason explanation by audio, retraining is performed such that the audio with an audio quality comfortable for an individual user can be outputted at the volume that does not inflict discomfort.

Note that the trained DNN which is used by the explanation generating unit 102 and estimates an operation reason explanation for an automatic operation performed by the television reception apparatus 100 is referred to as a "first machine learning model." In addition, the trained DNN by which the operation determination unit 101 estimates an automatic operation of the television reception apparatus 100 on the basis of a sensing result such as environment information is referred to as a "second machine learning model." The trained DNN which is used by the user emotion estimation unit 103 and estimates a user's emotion (either positive or negative) on the basis of a reaction from a user is referred to as a "third machine learning model."

The functional configuration illustrated in FIG. 3 includes a system in which feedback, such as the reaction from a user to an operation reason explanation generated for an automatic operation performed by the television reception apparatus 100, is obtained to generate an operation reason that fits the user. Accordingly, when an automatic operation is performed by the television reception apparatus 100 by using an artificial intelligence technique, for the operation reason thereof, it is possible to present an explanation that is easy for a user to understand.

In addition, in a case where the explanation generating unit 102 has generated multiple operation reason explanations with respect to one automatic operation performed by the television reception apparatus 100, the explanations are presented one-by-one in an order that the user should like, and the user's reaction is obtained. Accordingly, it is possible to obtain the user's reaction to a presented explanation with a little load on the user.

In addition, in the functional configuration illustrated in FIG. 3, it is possible to retrain the trained DNN, that is, the "first machine learning model," which is used by the explanation generating unit 102 and which estimates an operation reason explanation for an automatic operation performed by the television reception apparatus 100. Accordingly, the user continues to use the television reception apparatus 100, whereby learning is performed such that an operation reason explanation that is easy for the user to understand can be given when the television reception apparatus 100 performs an automatic operation.

F. Processing Operation

F-1. Overall Processing Procedure

Figure 5:
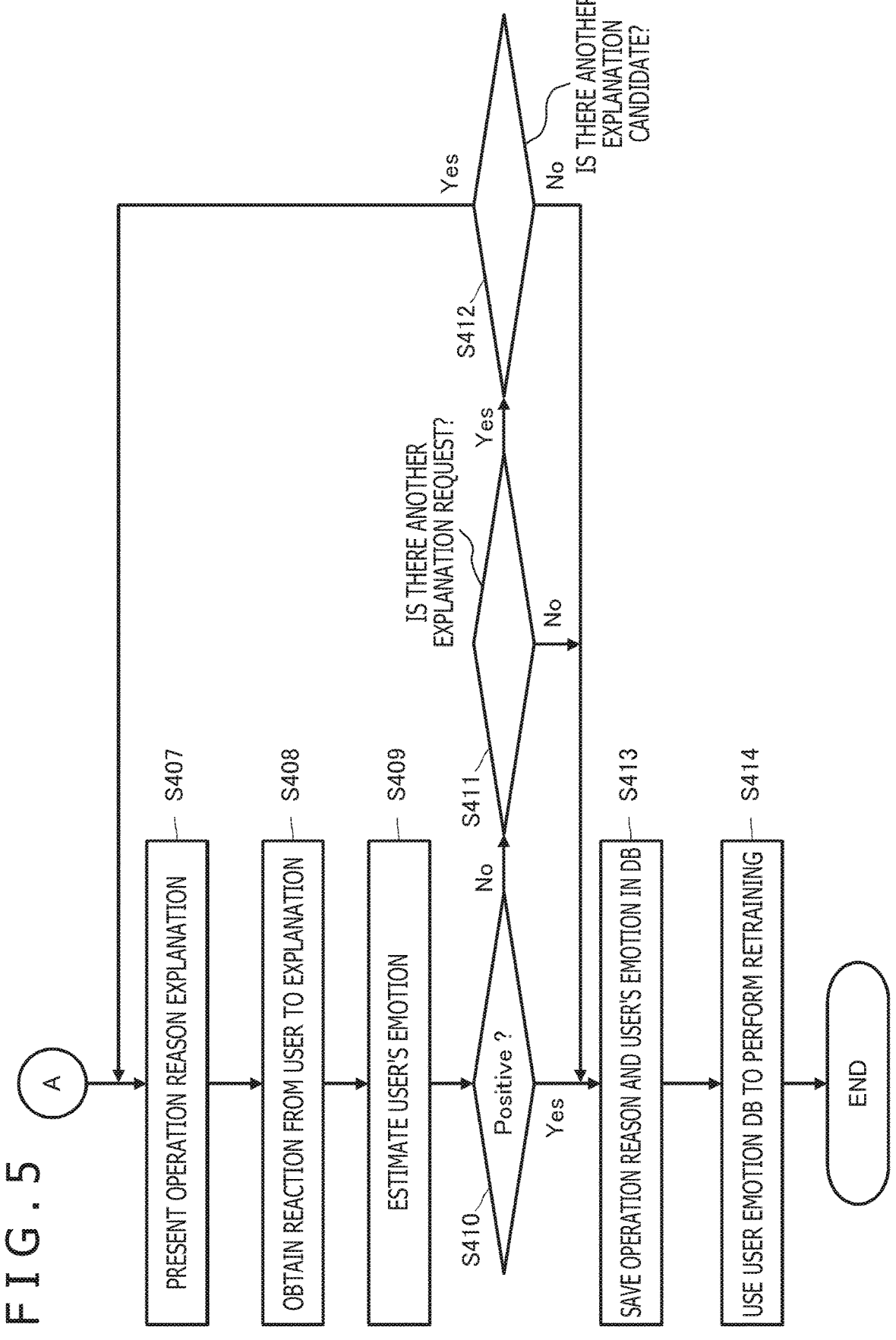
FIG. 5 is a flow chart that illustrates the processing procedure (latter half) for performing an automatic operation by the television reception apparatus 100, and performing an optimal operation reason explanation.

Next, description is given regarding an overall processing operation in which the television reception apparatus 100 with the functional configuration as illustrated in FIG. 3 automates an operation and gives an operation reason explanation. FIG. 4 and FIG. 5 illustrate, in a flow chart format, an overall processing procedure in which the television reception apparatus 100 automates an operation and gives an operation reason explanation.

Firstly, on the basis of a result of sensing the state of a user or the surrounding environment by the sensing function unit 300 (refer to FIG. 2), the operation determination unit 101 determines an operation for the television reception apparatus 100 by using an inference made by the trained DNN (described above) (step S401).

The operation determination unit 101 saves the determined operation in the operation history memory 111 (step S402). The operation determination unit 101 may save an inference history attained in determining the operation on the basis of a sensing result, in the operation history memory 111 together with the determined operation.

The main control unit 201 sends a control signal for performing the operation determined by the operation determination unit 101 to a corresponding functional module inside the television reception apparatus 100, and performs the automatic operation (step S403).

Next, a check is performed as to whether there is a request for presentation of an explanation from a user with respect to the automatic operation performed by the television reception apparatus 100 in step S403 (step S404). If there is no request for presentation of an explanation from a user (No in step S404), the process returns to step S401, and the processing described above is repeatedly executed.

In contrast, in a case where there is a request for presentation of an explanation from a user (Yes in step S404), the explanation generating unit 102 reads out, from the operation history memory 111, the operation for which the explanation presentation is requested, and also obtains a sensing result that is received as input from the sensing function unit 300 (step S405). Then, the explanation generating unit 102 uses the inference made by the trained DNN (described above) to generate such an explanation that will favorably be accepted by the user, in relation to a reason for the operation performed by the television reception apparatus 100, for which the presentation of an explanation has been requested (step S406). There may be a case in which the explanation generating unit 102 generates multiple operation reason explanations for one explanation presentation request.

Next, the operation reason explanation generated by the explanation generating unit 102 is presented to the user by using output means (such as a speaker or screen) that the television reception apparatus 100 is provided with, for example (step S407). The explanation generating unit 102 may select, on the basis of a user preference or the environment around the television reception apparatus 100, whether to display the generated explanation on a screen as text, to present the generated explanation as audio from a speaker, or to present the generated explanation using both a screen and audio.

The explanation generating unit 102 then saves the operation performed by the television reception apparatus 100, for which presentation of an explanation was requested, and the operation reason explanation that was generated (or presented to the user) at that time, in the user information database 112.

Next, the user emotion estimation unit 103 receives a reaction made by the user when the operation reason explanation generated by the explanation generating unit 102 is presented (step S408), and estimates the user's emotion (step S409). Here, in order to simplify the description, the user's emotion is assumed to be represented by two values: whether or not the user likes the presented operation reason (positive/negative). It is checked whether the user's emotion estimated by the user emotion estimation unit 103 is positive (step S410).

If the user's emotion with respect to the presented operation reason explanation is positive (Yes in step S410), the user emotion estimation unit 103 saves the user's "positive" emotion expressed when the operation reason explanation generated by the explanation generating unit 102 is presented, in the user information database 112 in association with the operation performed by the television reception apparatus 100 and the operation reason explanation therefor (step S413).

On the other hand, if the user's emotion with respect to the presented operation reason explanation is not positive (No in step S410), the user emotion estimation unit 103 additionally checks whether the user is requesting another explanation for the operation reason generated by the explanation generating unit 102 (step S411).

In a case where the user does not request another explanation for the operation reason (No in step S411), the user emotion estimation unit 103 saves the user's not "positive" (or "negative") emotion expressed when the operation reason explanation generated by the explanation generating unit 102 is presented, in the user information database 112 in association with the operation performed by the television reception apparatus 100 and the operation reason explanation therefor (step S413).

On the other hand, in a case where the user requests another explanation for the operation reason (Yes in step S411), a check is performed as to whether the explanation generating unit 102 has generated yet another explanation for the operation reason (step S412). In a case where the explanation generating unit 102 has generated yet another operation reason (Yes in step S412), the process returns to step S407, the other explanation is presented to the user, and the processing described above is repeatedly executed. In a case where the explanation generating unit 102 has not generated another explanation for the operation reason (No in step S412), the user emotion estimation unit 103 saves the user's not "positive" (or "negative") emotion expressed when the operation reason explanation generated by the explanation generating unit 102 is presented, in the user information database 112 in association with the operation performed by the television reception apparatus 100 and the operation reason explanation therefor (step S413).

The explanation generating unit 102 uses information accumulated in the user information database 112, to retrain the trained DNN that generates operation reason explanations (step S414).

Description is given in further detail regarding a processing operation for presenting an operation reason explanation with respect to an automatic operation performed by the television reception apparatus 100.

For example, suppose that the television reception apparatus 100 performs an automatic operation to turn the volume down, and a request for an explanation with respect to the operation is made by a user. In such a case, the explanation generating unit 102 reads out, from the operation history memory 111, the operation for which the request for presentation of an explanation is made, obtains the sensing result received as input from the sensing function unit 300, and uses an inference made by the trained DNN (described above) to generate, in relation to the reason why the television reception apparatus 100 performed the automatic operation to turn the volume down, the explanations "the current time is 10 PM," "there is only one user," and "the user is not watching the television." The explanation generating unit 102 uses the trained DNN (described above) to further infer which of the generated plurality of explanations the user will like. For example, it is assumed that, regarding the user who requests the presentation of an explanation, the fact that "the user is likely to accept an explanation based on the user's habits" has been learned. In this case, the explanation generating unit 102 estimates that, from among the generated plurality of explanations, the explanation that "because of a tendency to normally turn the volume down after 10 PM, the volume has automatically been adjusted this time" will be most accepted by the user as the operation reason explanation at this time.

Note that the explanation generating unit 102 may generate multiple explanation candidates for an automatic operation performed by the television reception apparatus 100, and present the user with the explanation candidates after rearranging the explanation candidates into an order that is easy for the user to accept. The explanation generating unit 102 may select, on the basis of a user preference or the environment around the television reception apparatus 100, whether to display the generated explanation on a screen as text, to present the generated explanation as audio from a speaker, or to present the generated explanation using both a screen and audio.

The user emotion estimation unit 103 receives a reaction made by the user when the operation reason explanation generated by the explanation generating unit 102 is presented, and estimates the user's emotion. In the flow charts illustrated in FIG. 4 and FIG. 5, the user emotion estimation unit 103 estimates whether or not the user likes (positive/negative) the presented operation reason. The user emotion estimation unit 103 is, for example, configured to indicate a result of estimating the user's emotion by such a ratio as some positive percent and some negative percent and, if the ratio for either positive or negative exceeds a threshold (for example, 85%), estimate that the user has a positive (or negative) emotion with respect to the operation reason explanation. Note that details of the processing procedure by which the user emotion estimation unit 103 estimates the user's emotion will be described below (refer to FIG. 6).

In the flow chart illustrated by FIG. 4 and FIG. 5, if the user's emotion with respect to a presented operation reason explanation is positive, the user emotion estimation unit 103 saves the user's "positive" emotion expressed when the operation reason explanation generated by the explanation generating unit 102 is presented, in the user information database 112 in association with the operation performed by the television reception apparatus 100 and the operation reason explanation therefor. On one hand, in a case where the user's emotion is negative with respect to the presented operation reason explanation or in a case where it is not possible to estimate the user's emotion (a case where the ratio for either positive or negative does not exceed the threshold), and in a case where the user requests another explanation for the operation reason explanation and the explanation generating unit 102 has also generated another explanation, the other explanation is presented to the user again, and the user emotion estimation unit 103 estimates the user's emotion with respect to this explanation. On the other hand, in a case where the user does not request another explanation or in a case where the user requests another explanation but the explanation generating unit 102 has not generated another explanation, the emotion that is not "positive" (or is "negative") expressed by the user when the operation reason explanation generated by the explanation generating unit 102 is presented is saved in the user information database 112 in association with the operation performed by the television reception apparatus 100 and the operation reason explanation therefor.

The explanation generating unit 102 uses information accumulated in the user information database 112, to retrain the trained DNN that generates operation reason explanations. Note that, in order to avoid using information having low reliability in retraining, in a case where the user's emotion expressed when an explanation is presented is vague (the ratio for either positive or negative does not exceed the threshold), saving of the information to the user information database 112 may not be performed.

When generating an explanation for a reason for the operation performed by the television reception apparatus 100, the explanation generating unit 102 probabilistically estimates whether or not the user will like the explanation, in other words, which reaction from among positive or negative the user will display. Accordingly, in retraining, the explanation generating unit 102 uses information in the user information database 112 acquired by the user emotion estimation unit 103, to correct the probability, and to thereby generate an explanation that the user is likely to accept and not generate an explanation that will make the user be uncomfortable. Thus, the accuracy of estimation can be improved. A concrete example is given below regarding a process for, in retraining, using information in the user information database 112, which is acquired by the user emotion estimation unit 103, to correct the probability for a reaction to an explanation generated by the explanation generating unit 102.

(1) Regarding an operation reason explanation for which it is estimated by the explanation generating unit 102 that a positive reaction will be obtained and for which a positive reaction has been obtained by the user emotion estimation unit 103, because such an operation reason explanation has to be presented to a user, the probability of estimating in the explanation generating unit 102 that a positive reaction will be obtained for this operation reason explanation is improved.

(2) Regarding an operation reason explanation for which the explanation generating unit 102 estimates a low probability of obtaining a positive reaction but for which a positive reaction has been obtained by the user emotion estimation unit 103, it is effective to present a user with such an operation reason explanation, and the probability of estimating in the explanation generating unit 102 that a positive reaction will be obtained for this operation reason explanation is improved.

(3) Regarding an operation reason explanation for which the explanation generating unit 102 estimates a low probability of obtaining a positive reaction and for which a negative reaction has been obtained by the user emotion estimation unit 103, because it is not effective to present a user with such an operation reason explanation, the probability of estimating in the explanation generating unit 102 that a positive reaction will be obtained for this operation reason explanation is reduced.

(4) Regarding an operation reason explanation for which the explanation generating unit 102 is unclear as to whether a positive reaction will be obtained but for which a positive reaction has been obtained by the user emotion estimation unit 103, it is effective to present a user with such an operation reason explanation, and the probability of estimating in the explanation generating unit 102 that a positive reaction will be obtained for this operation reason explanation is improved.

(5) Regarding an operation reason explanation for which the explanation generating unit 102 is unclear as to whether a positive reaction will be obtained and for which a negative reaction has been obtained by the user emotion estimation unit 103, because it is not effective to present a user with such an operation reason explanation, the probability of estimating in the explanation generating unit 102 that a positive reaction will be obtained for this operation reason explanation is reduced.

In addition, in a case where estimation of the user's emotion in the user emotion estimation unit 103 is vague with respect to an operation reason explanation generated by the explanation generating unit 102 (in a case where a ratio for either positive or negative does not exceed the threshold), the degree of increase or degree of decrease for the probability for the explanation in the explanation generating unit 102 may be adjusted according to the ratio for positive or negative. For example, if the ratio for positive is 100%, the probability of estimating in the explanation generating unit 102 that a positive reaction will be obtained is significantly increased.

Retraining in the explanation generating unit 102 as described above may be performed each time an estimation result is obtained from the user emotion estimation unit 103, or retraining may be performed periodically after accumulating information in the user information database 112 (for example, retraining is performed after information for the past 30 days has been accumulated).

F-2. Processing for Estimating User's Emotion

Figure 6:
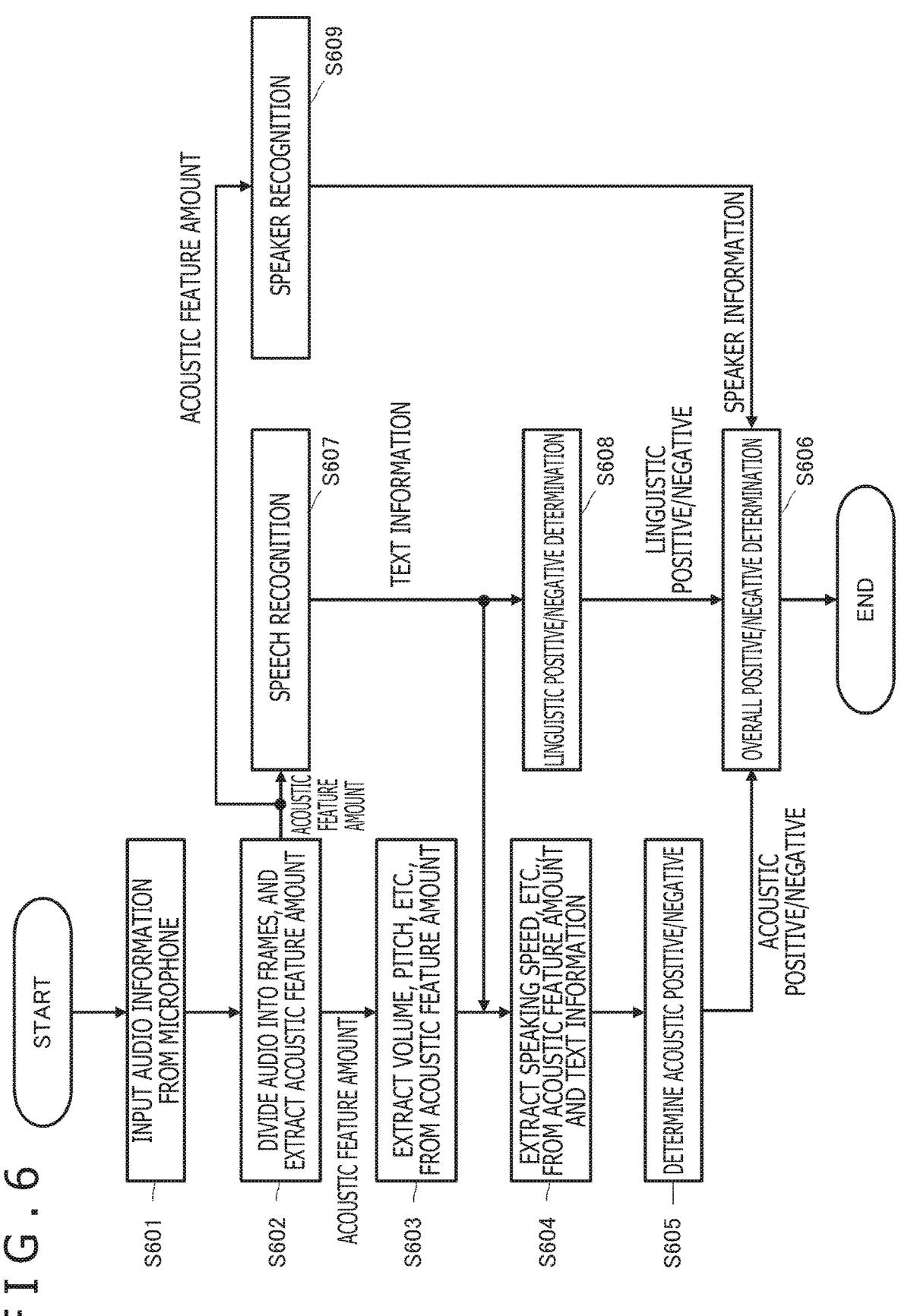
FIG. 6 is a flow chart that illustrates a processing procedure for a user emotion estimation unit 103 to estimate a user's emotion.

FIG. 6 illustrates, in the format of a flow chart, a processing procedure which is executed in step S409 in the flow chart illustrated in FIG. 5 and in which the user emotion estimation unit 103 estimates the user's emotion. Here, in order to simplify the description, it is assumed that the user's speech which is picked up by a microphone is used as the user's reaction and that the user's emotion is represented by a binary value of whether or not the user likes a presented operation reason (positive/negative). In addition, it is assumed that the user emotion estimation unit 103 uses, as appropriate, a trained neural network model such as a paralanguage analysis neural network, a speech recognition neural network, a natural language processing neural network, a speaker recognition neural network, and an overall positive/negative determination neural network.

When receiving audio information as input from a microphone (step S601), the user emotion estimation unit 103 divides the received audio into frames each of which is of several tens of milliseconds, for example, and extracts an acoustic feature amount from each frame (step S602).

The user emotion estimation unit 103 extracts volume, pitch, etc., from the extracted acoustic feature amounts (step S603). In addition, the user emotion estimation unit 103 uses a speech recognition neural network to estimate text information from the acoustic feature amounts for the microphone input audio (step S607). Moreover, the user emotion estimation unit 103 uses a speaker recognition neural network to estimate speaker information for the audio inputted from the microphone (step S609).

Next, the user emotion estimation unit 103 extracts para-language, namely, paralanguage information, which includes an utterance speed, an intonation, a rhythm, pauses, and an audio quality, from the acoustic feature amounts and the text information estimated by the speech recognition neural network (step S604). The user emotion estimation unit 103 uses a paralanguage analysis neural network to determine an acoustic positive/negative for the microphone input audio (step S605).

The user emotion estimation unit 103 also uses a natural language processing neural network to determine a linguistic positive/negative (step S608).

The user emotion estimation unit 103 then uses an overall positive/negative determination neural network to make an overall determination of whether the user's emotion is positive or negative, from the acoustic positive/negative determination, the linguistic positive/negative determination, and the speaker information (step S606).

Description is given in further detail regarding a processing operation for using audio information to estimate the user's emotion.

Paralanguage information, text information, and speaker information are extracted from feature amounts extracted after the audio information inputted from the microphone is divided, for example, into frames in units of several tens of milliseconds. For speaker information, it is possible to estimate, by using a trained speaker information neural network, the correlation between an acoustic feature amount and a user's voice that has been registered in advance. In addition, for text information for microphone input audio, it is possible to estimate the correlation between text and an acoustic feature amount by using a trained speech recognition neural network. Further, as paralanguage information, for example, it is possible to calculate the volume or pitch from acoustic feature amounts and calculate a speaking speed by using the text information and acoustic feature amounts. It is possible to analyze the obtained paralanguage information and text information by using the paralanguage analysis neural network and the natural language processing neural network, respectively, and estimate to what degree each of positive and negative elements is included in the paralanguage information and text information.

Finally, on the basis of acoustic positive/negative information, linguistic positive/negative information, and speaker information, the overall positive/negative determination neural network determines a ratio at which the microphone input audio includes each of positive or negative elements.

In the processing procedure illustrated in FIG. 6, by using paralanguage information in addition to a speech recognition result, it is possible to detect differences in impressions depending on how the speaker speaks, from the same phrase, for example, "isn't that OK?" In addition, in the processing procedure illustrated in FIG. 6, by also using speaker information, it is possible to estimate positive/negative while taking into consideration individual differences between speech characteristics for each user.

In the processing procedure illustrated in FIG. 6, the user emotion estimation unit 103 uses multiple neural networks such as a paralanguage analysis neural network, a speech recognition neural network, a natural language processing neural network, a speaker recognition neural network, and an overall positive/negative determination neural network in order to estimate the user's emotion from the audio information. For example, these neural networks are optimized for each user who uses the television reception apparatus 100.

Note that the user emotion estimation processing procedure illustrated in FIG. 6 basically uses only audio information to estimate the user's emotion. Needless to say, for example, by performing expression recognition on a face image of a user that is captured by a camera or displaying a questionnaire on the television screen to get an answer from the user with the use of a remote controller button, etc., information other than audio may be used to estimate the user's emotion, or the audio information may be combined with a face image of the user or a result of the answer to the questionnaire to thereby comprehensively estimate the user's emotion.

Figure 7:
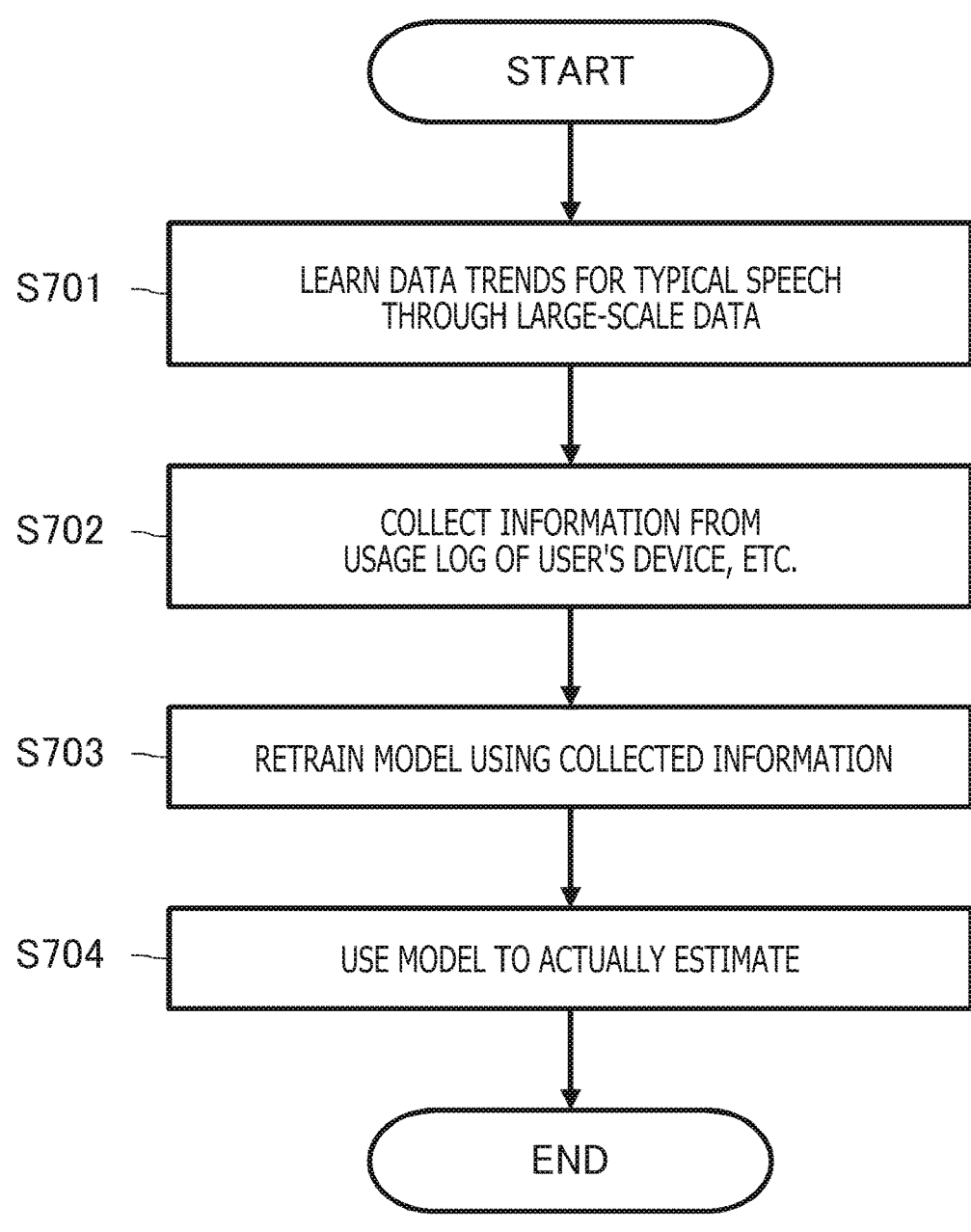
FIG. 7 is a flow chart that illustrates a processing procedure for optimizing, for each user, a neural network used by the user emotion estimation unit 103.

FIG. 7 illustrates, in a flow chart format, a processing procedure for optimizing, for each user, the neural networks used by the user emotion estimation unit 103.

Firstly, a neural network model is caused to learn data trends for typical voice through large-scale data (step S701). It is envisioned that this processing is performed by a cloud, for example.

A neural network model for which pre-training with large-scale data has finished is installed in the user emotion estimation unit 103 in an individual user's television reception apparatus 100. A usage log is collected while the user uses the television reception apparatus 100 (step S702). Retraining of the neural network model installed in the user emotion estimation unit 103 is performed by using the usage log from the user that is collected in the television reception apparatus 100 (step S703).

Thereafter, the user's emotion is actually estimated by using the retrained neural network model (step S704). As the user uses the television reception apparatus 100 for a longer period of time, retraining of the neural network model is more repeatedly performed on the basis of a usage log collected every time the user uses the television reception apparatus 100. As a result, it is possible to optimize the neural network model according to the characteristics of an individual user.

In the case of a paralanguage analysis neural network, it is assumed that training (pre-training before product shipment) is performed in advance such that an emotion can be estimated from audio by using correct answer label information including audio feature data and an emotion, which is data trends for typical speech in large-scale data. An example of the correct answer label information is that "a user has a specific speech tendency when the user gets angry (volume increases, speaking speed quickens, etc.)." Thereafter, in order to perform retraining to adapt to audio features of an individual user who purchases a product, data including a pair of an audio feature and an emotion is obtained from a usage log of the television reception apparatus 100 that is sensed by the device state sensor unit 340, or from a usage situation of another device. For example, when user speech which highly possibly indicates a linguistically negative meaning, such as "hard to use," is inputted to a microphone, a feature of this audio is obtained while being paired with negative information and is then accumulated. On the other hand, when user speech which highly possibly indicates a linguistically positive meaning, such as "this is great!," is inputted to a microphone, a feature of this audio is obtained while being paired with positive information and is then accumulated. Retraining is performed by using data collected in such a manner, as input to the paralanguage analysis neural network, whereby it is possible to adapt to audio features of an individual user.

G. Example of Realizing Operation Reason Explanation

In this section, description is given regarding a concrete example in which an operation reason explanation generated by the explanation generating unit 102 is presented to a user.

(1) Case of Presenting Operation Reason Explanation without Impairing User's Television Viewing Experience For example, it is possible to estimate a level of user's concentration on viewing a television, on the basis of line-of-sight information sensed by the user state sensor unit 320. In a case where a user concentrates on viewing television, output of an operation reason explanation by audio is avoided, and the operation reason explanation is presented by a pop-up display in a corner of a screen. In a case where the user requests a detailed display, a detailed explanation for the operation reason is displayed on the screen.

In addition, it is possible to estimate, on the basis of a user profile sensed by the user profile sensor unit 350, whether a television program being viewed matches the user's preferences. In a case where the user is concentrating on viewing television and is watching a program that matches the user's preferences, a commercial time period is detected, and the operation reason explanation is presented on the screen at a timing during the commercial time period. In addition, in a case where a commercial time period cannot be detected within a certain period of time after presentation of an explanation for an operation reason is requested, the operation reason explanation may be presented by using another device that cooperates with the television reception apparatus 100, such as a smartphone possessed by the user or a smartphone or robot that interacts with the user.

(2) Case of Presenting an Operation Reason Explanation to a User Who is not Watching a Television Screen When a user is moving about in front of the television or the user is concentrating on another device such as a smartphone or a music player, it is possible to estimate that the user is not concentrating on the television program. In a case where the user is moving about in front of the television and not concentrating on a television program, the volume of television content is turned down, and an operation reason explanation is performed by audio.

In addition, in a case where the user is operating another device such as a smartphone or a music player and is not concentrating on a television program, the operation reason explanation may be presented by using another device. A notification may be given to the user with the use of another device to cause the user to pay attention to the television screen, and the operation reason explanation may then be presented on the screen of the television reception apparatus 100.

(3) Case of Presenting Operation Reason Explanation while Multiple Users are Present A natural language processing technique is used to analyze explanatory text generated by the explanation generating unit 102, and a check is made as to whether the explanatory text includes personal information regarding the user (hobbies, preferences, lifestyle habits, etc.) or sensitive information. In a case where the operation reason explanation includes personal information regarding the user or sensitive information, output from a microphone or output on a television screen may be avoided because another user can hear or see the information, and the operation reason explanation may be presented by using another device that cooperates with the television reception apparatus 100, such as a smartphone possessed by the user or a smartphone or robot that interacts with the user.

H. Example of Realizing Voice Input from User for Emotion Estimation

The user emotion estimation unit 103 estimates, mainly on the basis of information regarding a sound uttered by a user, estimates the user's emotion with respect to a presented operation reason explanation. In this section, description is given regarding a concrete example in which audio from the user is inputted in order to estimate the user's emotion with respect to an operation reason explanation.

(1) Case of Obtaining Clear Audio from the User while the User is Viewing Television In a case of obtaining user speech by using a microphone provided in the television reception apparatus 100, although a sound outputted from the television gets in the microphone, only user speech can be extracted by an echo-canceling technique, and the user's emotion can be estimated with high accuracy.

If the television reception apparatus 100 is equipped with multiple microphones, it is possible to reduce the gain of a noise by using beam forming and emphasize user speech.

In addition, once an operation reason explanation is presented, audio guidance or a screen display may prompt the user for an utterance, and the output volume of the television may be turned down during the utterance to make it easier to extract user speech.

It is possible to pick up user speech by using, in addition to a microphone in the main body of the television reception apparatus 100, a microphone installed in the remote controller or a microphone in a device that cooperates with the television reception apparatus 100, such as a smartphone, a smart speaker, or a robot. Which microphone to use is determined according to a noise level of the surrounding environment, and the user is instructed to make an utterance to the appropriate microphone. For example, in a case where it is noisy in the surrounding, it is sufficient to cause the user to use a microphone in a smartphone close to the user's mouth and prompt the user to make an utterance.

(2) Case where it is not Possible to Acquire User Speech Well

A voice synthesis technique is used to generate an apologetic voice in order to prompt the user to make an utterance again. In a case where a cause why obtaining of the speech fails is other than a sound outputted from the television, the user may be asked to improve the environment (asked to speak slowly, etc.).

(3) Case of Obtaining User Speech Such that Television Viewing Experience is not Impaired In a case where a user is concentrating on viewing television and is viewing a program that matches the user's preferences, a priority of obtaining the user's reaction to a presented explanation may be reduced. For example, in a case where the user concentrates on particularly viewing a program, presentation of any kind of notification information may possibly interrupt the user. It is conceivable that a result of estimating the user's emotion which is obtained in such a case as described above greatly differs from a result of emotion estimation obtained at a time when the user normally views the television. In such a case, a notification related to obtaining of a reaction may be left on another terminal such as a smartphone, or the user's reaction may not necessarily need to be obtained.

(4) Case of Extracting Only Impression with Respect to Contents of Explanation

In a case where an impression of an operation reason explanation is freely accepted by audio input from the user, it is necessary to distinguish between an impression of the contents of the explanation and an impression of the method of presenting the explanation. If only an impression of the contents of an explanation can be extracted, the explanation generating unit 102 can evaluate whether generation of the explanation is a success, and use the result to retrain the explanation generating unit 102. Accordingly, the user emotion estimation unit 103 combines information regarding a most recent output destination to which an explanation is presented and a speech recognition result, to estimate whether the user's speech is an impression of the contents of the explanation or the method of presenting the explanation. For example, in a case where the explanation generating unit 102 has recently improved the explanation presentation method, it is possible that the user's speech is a reaction to the explanation presentation method. The user may be asked as to what the user has reacted to. In addition, in a case where it is not possible to identify whether the user's speech is an impression of the contents of the explanation or the method of presenting the explanation, a determination may be made such that data obtained at this time is not used to retrain the explanation generating unit 102. In contrast, in a case where the explanation generating unit 102 has not changed the explanation presentation method recently (or within a certain duration), the user's speech may be determined to be a reaction to the contents of the explanation, and the user emotion estimation unit 103 may estimate the user's emotion.

(5) Case where it is Difficult to Estimate the User's Emotion from Only Speech

In a case where it is difficult to estimate the user's emotion from only speech, the user emotion estimation unit 103 may change the method of obtaining the user's reaction, from voice input to a format where a selection is made on a screen. For example, in a case where a state in which a correct answer label cannot be assigned to a presented explanation has continued for a certain period of time or at a certain ratio (for example, in a case where the same state has continued for a month or correct answer labels cannot be assigned to presented explanations in number corresponding to 80% or more of the number of times the user has requested presentation of an explanation) due to extraction of speaker characteristics from speech, a result of emotion estimation, or the fact that both of the ratios for positive and negative for a specific user do not exceed a threshold (or are always determined to be neutral), the method of obtaining the user's reaction is changed from voice input to a format where a selection is made on a screen. For example, three options including "accepted," "cannot understand what the explanation means," and "I want to see another explanation" are presented, and the user is prompted to make a selection by using a remote control operation, etc.

I. Operation for Presenting Operation Reason Explanation

In this section, on the basis of the functional configuration illustrated in FIG. 3, description is given regarding specific operations for explaining a reason for an automatic operation performed by the television reception apparatus 100, focusing on the explanation generating unit 102.

I-1. Associating Query for Operation Reason with Operation History

Various methods are available for a user to ask a reason for an automatic operation performed by the television reception apparatus 100. For example, the user may ask a reason by operating the operation input unit 222 or a remote controller (an "ask operation reason" button may be installed), or the user may use a voice agent function in the television reception apparatus 100 to inquire by audio (for example, by asking "why did you do that just now?").

Figures 8, 9:
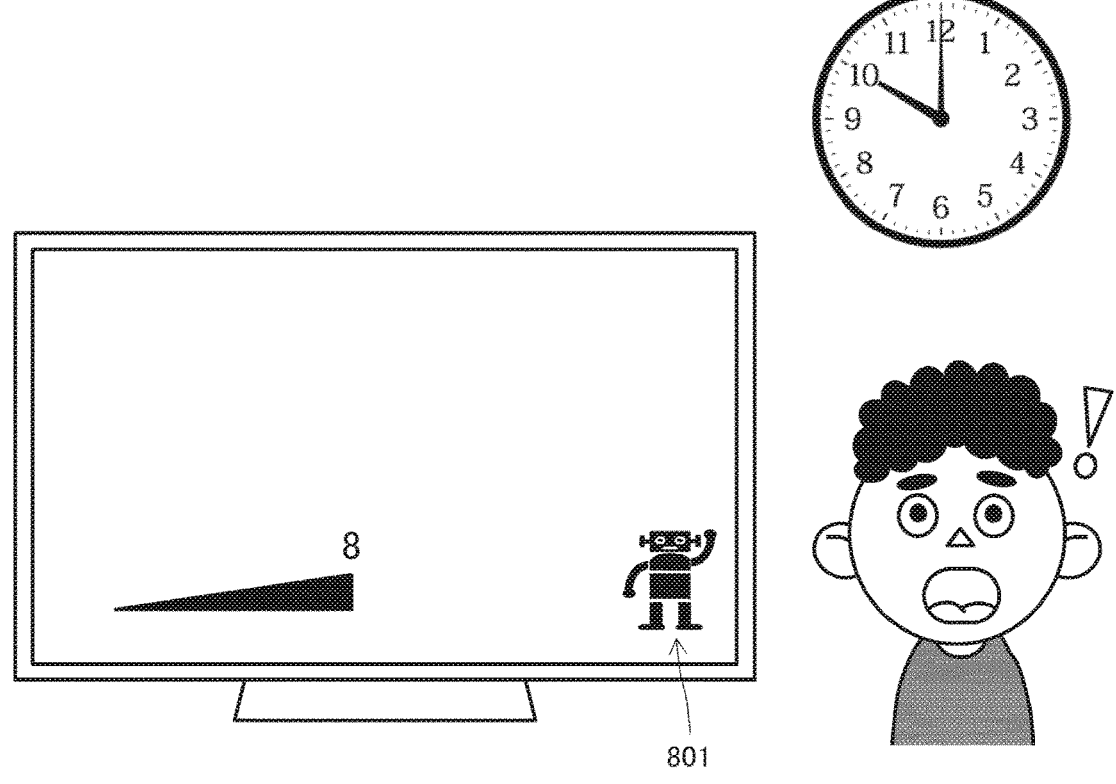
FIG. 8 is a view that illustrates an example of a television screen displaying that an automatic operation has been performed on the basis of a determination made by an artificial intelligence function.
FIG. 9 is a view that illustrates an example of a configuration of an operation history list read out from an operation history memory 111.

Note that a screen or audio guidance may be used to clearly explain to the user that an automatic operation of the television reception apparatus 100 is based on an artificial intelligence function using a neural network model. FIG. 8 illustrates an example in which a specific mark 801 is displayed on the television screen. The specific mark 801 indicates that a volume adjustment has been performed according to a determination made by the artificial intelligence function. Note that, instead of a screen, an LED (Light Emitting Diode) may be used to emit light in a specific pattern or color, whereby the user is notified that an automatic operation has been performed according to the artificial intelligence function. Similarly, such means as the mark 801 or a light-emission expression may be used to present, to the user, that presentation of an operation reason is based on an artificial intelligence function.

In a case where a user requests an operation reason explanation, it is necessary to specify the automatic operation which has been performed by the television reception apparatus 100 and for which the operation reason explanation is requested. With the functional configuration illustrated in FIG. 3, the explanation generating unit 102 reads out the most recent operation from the operation history memory 111. In a case where it is not possible to specify the automatic operation for which the user requests the operation reason explanation, the user may be asked to clearly indicate the operation for which the user requests presentation of an explanation.

For example, information from the operation history saved in the operation history memory 111 may be displayed on the television screen, and the user may be asked to select an operation for which the user requests presentation of an explanation, from among pieces of the displayed information. The operation history memory 111 saves an operation automatically executed by the television reception apparatus 100 on the basis of the artificial intelligence function, and the time at which the operation was executed. For example, as illustrated in FIG. 9, an operation history list read out from the operation history memory 111 is displayed on the television screen. The user can, for example, use a cursor button on the remote controller to select an operation for which to request presentation of an explanation. In such a manner, it is possible to specify the operation for which the user requests the operation reason explanation.

I-2. Inference and Learning by Explanation Generating Unit

In a case where there is a request for presentation of an explanation from a user, the explanation generating unit 102 generates an explanation for a reason for the operation performed by the television reception apparatus 100, which has been determined by the operation determination unit 101, in such a manner that the explanation will favorably be accepted (or easily be accepted) by the user. When presentation of an explanation for an operation reason is requested by a user, the explanation generating unit 102 generates and presents, to the user, one or more explanations for one operation. Retraining of the DNN that infers explanations is performed by using the user's reaction that is estimated by the user emotion estimation unit 103 as a correct answer label. Such a cycle of generating an operation reason explanation and retraining the DNN is repeated, whereby the explanation generating unit 102 becomes able to generate an explanation that is easy to understand for each user.

Figure 10:
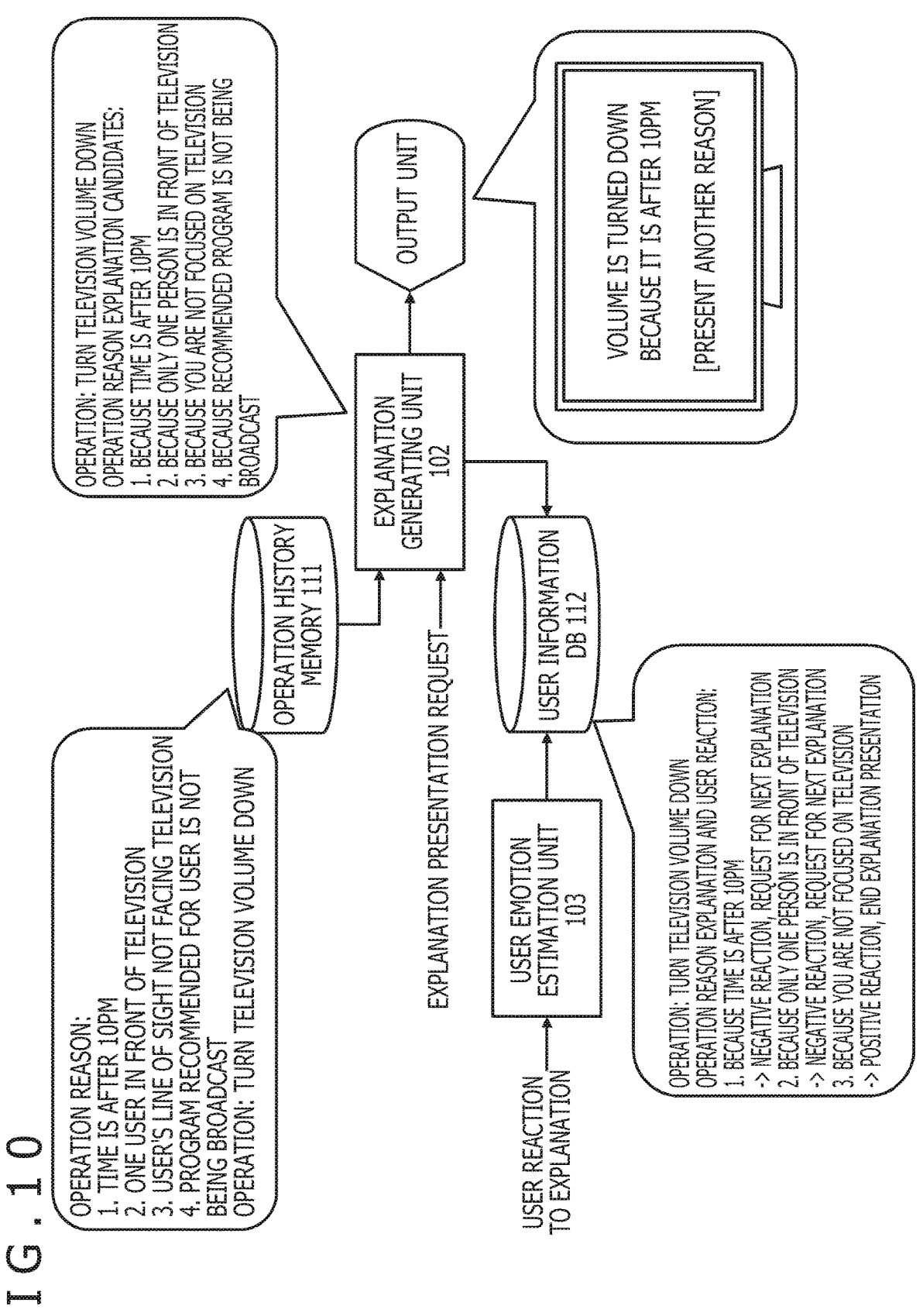
FIG. 10 is a view that illustrates an example of the operation of an explanation generating unit 102.

FIG. 10 illustrates an example of the operation of the explanation generating unit 102 in a state where the user has just started using the television reception apparatus 100. In order to simplify the description, it is assumed that a determined operation and an inference history indicating how the operation has been determined on the basis of a sensing result are saved in the operation history memory 111.

For example, when the operation determination unit 101 determines an operation of automatically turning the television volume down, the operation of "turning the television volume down," which is determined by the operation determination unit 101, and one or more reasons why the operation determination unit 101 infers the operation (the example in FIG. 10 illustrates the four reasons: "the time is after 10 PM," "one user in front of the television," "user's line of sight is not facing the television," and "program recommended for user is not being broadcast") are saved in the operation history memory 111.

Here, in a case where there is a request to explain the reason for the operation of "turning the television volume down" from the user, the explanation generating unit 102 collects information that will be a reason for this operation. In the example illustrated in FIG. 10, the explanation generating unit 102 collects four reasons: "the time is after 10 PM," "one user in front of the television," "user's line of sight is not facing the television," and "program recommended for user is not being broadcast."

In a case where the user has just started using the television reception apparatus 100, learning is not sufficient for the explanation generating unit 102 to estimate what kind of operation reason explanation fits the user's preferences. Accordingly, the explanation generating unit 102 selects one of multiple operation reasons in an order from a highest ratio of most contributing to the determination of the operation in the operation determination unit 101, an order of being written to the operation history memory 111, or randomly, generates an explanation, and uses an output unit such as a screen or a speaker to present the explanation to the user. In the example illustrated in FIG. 10, from the operation reasons "the time is after 10 PM," "one user in front of the television," "user's line of sight is not facing the television," and "program recommended for user is not being broadcast," the explanation generating unit 102 generates corresponding pieces of explanatory text: "because the time is after 10 PM," "because only one person is in front of the television," "because you are not focused on the television," and "because a recommended program is not being broadcast." When the explanation generating unit 102 selects the operation reason "because the time is after 10 PM" from among the operation reasons, the explanatory text "volume is turned down because it is after 10 PM" is displayed on the television screen.

The explanation generating unit 102 may generate a predetermined number of explanations or may change the number of explanations to be generated, according to the number of operation reasons.

The explanations generated by the explanation generating unit 102 are presented to the user in order one-by-one. The user emotion estimation unit 103 estimates the user's reaction expressed when the explanation is presented. If the user indicates a positive reaction, presentation of an operation reason explanation ends. On the other hand, in a case where the user indicates a negative reaction when the explanation is presented or the reliability of an emotion estimation result is low, another operation reason explanation that has been generated by the explanation generating unit 102 is presented.

In addition, an explanation presented to the user and the user's reaction thereto are sequentially saved in the user information database 112 so as to be used for retraining, in association with the operation performed by the television reception apparatus 100 and the operation reason explanation therefor. In the example illustrated in FIG. 10, "because the time is after 10 PM," "because only one person is in front of the television," "because you are not focused on the television," and "because a recommended program is not being broadcast" are presented in this order to the user as operation reason explanations for the automatic operation of "turning the television volume down." In this example, the user's reaction is negative to both the first explanation "because the time is after 10 PM" and the second explanation "because only one person is in front of the television," but the user's reaction to the third explanation "because you are not focused on the television" is positive. Such user's reactions to the explanations are saved in the user information database 112.

FIG. 11 illustrates an example of the operation of the explanation generating unit 102 at a time of learning.

After a cycle in which an operation determined by the operation determination unit 101 is automatically executed by the television reception apparatus 100 and the user requests an operation reason explanation therefor is repeated multiple times, explanations for reasons for operations performed by the television reception apparatus 100 and the user's reactions thereto are accumulated in the user information database 112. In the example illustrated in FIG. 11, pieces of information regarding operation reason explanations for the following three types of automatic operations and the user's reactions thereto are accumulated in the user information database 112.

Operation 1: Turn a Television Power Supply on
Operation Reason Explanation and Reaction:
  1. User watched a television screen for a certain period of time
    Positive reaction, end explanation presentation
Operation 2: Start Recording Automatically
Operation Reason Explanation and Reaction:
  1. Because recording was frequently performed in the past
    Negative reaction, request for next explanation
  2. Because multiple users are talking and you cannot focus on the television
    Positive reaction, end explanation presentation
Operation 3: Turn the Television Volume Down
Operation Reason Explanation and Reaction:
  1. Because the time is after 10 PM
    Negative reaction, request for next explanation
  2. Because only one person is in front of the television
    Negative reaction, request for next explanation
  3. Because you are not focused on the television
    Positive reaction, end explanation presentation The explanation generating unit 102 uses a user emotion estimation result (in particular, an estimation result in which positive or negative exceeds a predetermined ratio and the reliability is high) by the user emotion estimation unit 103 as correct answer label, and learns the regularity, more specifically, learns what kind of explanation the user accepts. For example, as the result of learning, such a tendency that "this user is likely to accept an explanation for a reason based on a result of sensing the environment near the television" is found.

FIG. 12 illustrates an example of the operation of the explanation generating unit 102 in a state where learning has advanced.

It is assumed that a user requests an explanation for an operation reason why subtitles are automatically displayed on the television reception apparatus 100. The explanation generating unit 102 reads out, from the operation history memory 111, information regarding an operation reason for the operation of automatically displaying subtitles. It is assumed that three operation reasons are read out: "subtitles are frequently turned on for this program," "high level of noise near the television," and "user who often uses subtitles is in front of the television."

The explanation generating unit 102 then explains one or more operation reason explanation candidates on the basis of an operation inference process and a tendency for explanations that the user likes. Here, such a tendency that "this user is likely to accept an explanation for a reason based on a result of sensing the environment near the television" is found as a learning result. Then, from the collected operation reasons, the explanatory text is generated such that "because level of noise near the television is high" is generated as a first candidate for an explanation, "because user who often uses subtitles is watching the television" is generated as a second candidate for an explanation, and "because there is a high frequency that subtitles are turned on for this program" is generated as a third candidate for an explanation. In the example illustrated in FIG. 12, the first candidate for the explanation "because level of noise near the television is high" is selected, and the explanatory text "subtitles are displayed because of large amount of noise near the television" is displayed on the television screen.

The explanations generated by the explanation generating unit 102 are presented to the user in the order for the candidates, one-by-one. The user emotion estimation unit 103 estimates the user's reaction expressed when an explanation is presented. If the user indicates a positive reaction, presentation of an operation reason explanation ends. On the other hand, in a case where the user indicates a negative reaction when an explanation is presented or the reliability of an emotion estimation result is low, the next candidate explanation that has been generated by the explanation generating unit 102 is presented. In addition, an explanation presented to the user and the user's reaction thereto are sequentially saved in the user information database 112 so as to be used for retraining, in association with the operation performed by the television reception apparatus 100 and the operation reason explanation therefor.

In the description thus far, the explanation generating unit 102 rearranges, on the basis of a learning result, multiple candidates for explanatory text which have been explained, and presents the candidates in an order according to the user's reaction. Further, even with the same explanation contents, the explanation generating unit 102 may change a method of expressing the explanatory text, such as words or phrases used in an explanation, according to the user's preference. For example, for each user, the explanation generating unit 102 may rephrase words used in an explanation to something simple, or change the granularity of the explanation to be coarser or finer.

In addition, in the description thus far, the explanation generating unit 102 learns a tendency for each user, such as "the user is likely to accept an explanation based on a result of sensing the environment near the television" or "the user is likely to accept an explanation based on the user's habits." Further, the explanation generating unit 102 may learn an explanation presentation method that a user likes, such as presentation by audio, presentation by text on a screen, or presentation using a diagram on a screen, and even with the same explanation contents, change the explanation presentation method for each user.

Further, in order to learn tendencies for words or phrases in an explanation and an explanation presentation method which are preferred by a user, the explanation generating unit 102 may use, as training data, user profile information (includes a device usage history of the user, SNS posts, or viewing history) sensed by the user profile sensor unit 350, in addition to a past positive or negative reaction from the user that was estimated by the emotion estimation unit 103.

In such a manner, by virtue of the functional configuration illustrated in FIG. 3, in the process in which the user uses the television reception apparatus 100, each time the television reception apparatus 100 performs an automatic operation and presents an operation reason explanation according to a request from a user, obtaining of the user's reaction and learning are repeated, whereby it becomes possible to explain an operation reason to a user by using an operation reason, a method of expressing explanatory text, and an explanation presentation method that are likely to be accepted by the user.

J. Learning that Includes Determining an Operation

Thus far, description has been given regarding learning which is performed such that the presentation of an explanation for a reason for an automatic operation performed by the television reception apparatus 100 with the functional configuration illustrated in FIG. 3 matches a user's preferences. Further, it is also possible to perform learning by the operation determination unit 101 such that the television reception apparatus 100 performs an automatic operation that conforms to the user's preferences.

J-1. Overall Flow

FIG. 13 illustrates, in a flow chart format, an overall processing procedure in which the television reception apparatus 100 automates an operation and gives an operation reason explanation. The processing procedure in FIG. 13 is different from the processing procedure illustrated in FIG. 4 and FIG. 5 in mainly that learning is performed for both an automatic operation determined by the operation determination unit 101 and presentation of an explanation for an operation reason generated by the explanation generating unit 102.

Firstly, on the basis of a result of sensing the state of a user or the surrounding environment by the sensing function unit 300 (refer to FIG. 2), the operation determination unit 101 determines an operation for the television reception apparatus 100 by using an inference made by the trained DNN (described above) (step S1301).

The operation determination unit 101 then saves the determined operation in the operation history memory 111 (step S1302). The operation determination unit 101 may save an inference history attained in determining the operation on the basis of a sensing result, in the operation history memory 111 together with the determined operation.

The main control unit 201 sends a control signal for performing the operation determined by the operation determination unit 101, to a corresponding functional module inside the television reception apparatus 100, and performs an automatic operation (step S1303).

Next, the user emotion estimation unit 103 obtains a reaction from the user expressed when the operation determined by the operation determination unit 101 is performed by the television reception apparatus 100 (step S1304), and attempts to estimate the user's emotion (step S1305). Here, in order to simplify the description, the user's emotion is assumed to be represented by two values: whether or not the user likes the operation performed by the television reception apparatus 100 (positive/negative).

In a case where it is not possible to estimate the user's emotion (No in step S1305), learning in the operation determination unit 101 and the explanation generating unit 102 is omitted, the process returns to step S1301, and determination of an operation for the television reception apparatus 100 based on a sensing result is repeatedly performed.

In a case where it is possible to estimate the user's emotion (Yes in step S1305), the user emotion estimation unit 103 checks whether the estimated user's emotion is negative (step S1306). In a case where the user's emotion is not negative (or in a case where the user's emotion is positive) (No in step S1306), the user is not unsatisfied with the operation of the television reception apparatus 100 determined by the operation determination unit 101, and therefore, there is no need to retrain the operation determination unit 101 or present an explanation for a reason for the operation performed by the television reception apparatus 100. Accordingly, in this case, the process returns to step S130, and determination of an operation for the television reception apparatus 100 based on a sensing result is repeatedly performed.

In contrast, in a case where the user's emotion with respect to the operation performed by the television reception apparatus 100 is negative (or in a case where the user's emotion is not positive) (Yes in step S1306), it is considered to be necessary to present the user with an explanation for a reason for the automatic operation performed by the television reception apparatus 100 in step S1303. Accordingly, the explanation generating unit 102 uses an inference made by a trained DNN (described above) to generate such an explanation that will favorably be accepted by the user, in relation to a reason for the operation performed by the television reception apparatus 100, for which the presentation of an explanation has been requested, and the generated operation reason explanation is presented to the user by using output means (such as a speaker or a screen) that the television reception apparatus 100 is provided with, for example (step S1307).

Next, the user emotion estimation unit 103 obtains the user's reaction expressed when the operation reason explanation generated by the explanation generating unit 102 is presented (step S1308) and attempts to estimate the user's emotion (step S1309).

In a case where it is not possible to estimate the user's emotion (No in step S1309), learning in the explanation generating unit 102 is omitted, the process returns to step S1301, and determination of an operation for the television reception apparatus 100 based on a sensing result is repeatedly performed.

In a case where it is possible to estimate the user's emotion (Yes in step S1309), the user emotion estimation unit 103 checks whether the estimated user's emotion is negative (step S1310). In a case where the user's emotion is not negative (or in a case where the user's emotion is positive) (No in step S1310), the user is not unsatisfied with the operation of the television reception apparatus 100 determined by the operation determination unit 101 and the operation reason explanation generated by the explanation generating unit 102, and therefore, there is no need to retrain the operation determination unit 101 or the explanation generating unit 102. Accordingly, in this case, the process returns to step S1301, and determination of an operation for the television reception apparatus 100 based on a sensing result is repeatedly performed.

In contrast, in a case where the user's emotion with respect to the presented explanation is negative (or in a case where the user's emotion is not positive) (Yes in step S1310), it is necessary to retrain the operation determination unit 101 or the explanation generating unit 102. Accordingly, the user emotion estimation unit 103 saves the user's "negative" emotion expressed when the operation reason explanation generated by the explanation generating unit 102 is presented, in the user information database 112 in association with the operation performed by the television reception apparatus 100 and the operation reason explanation therefor (step S1311). By using information accumulated in the user information database 112, the operation determination unit 101 then retrains the trained DNN that determines operations, and the explanation generating unit 102 retrains the trained DNN that generates operation reason explanations (step S1312).

Description is given in further detail regarding a processing procedure for retraining the operation determination unit 101 and the explanation generating unit 102.

The television reception apparatus 100 automatically executes an operation determined by the operation determination unit 101. In only a case where the user's reaction is negative with respect to this operation, it is determined that presentation of an explanation to the user is necessary, and the explanation generating unit 102 performs processing for generating an operation reason explanation and presents this explanation to the user.

For example, when the television reception apparatus 100 automatically turns the volume up in response to a noise near the television reception apparatus 100, the user performs an operation to turn the volume down with the remote controller. In addition, when the television reception apparatus 100 changes the screen luminance depending on the environment, the user performs an operation to return the screen luminance to its original state. In such a manner, in a case where a user performs a negative operation in relation to an automatic operation performed by the television reception apparatus 100, it is possible to determine that the user needs to explain an operation reason.

Note that it is also possible to present an operation reason explanation to a user in a case where the user's reaction is positive. However, if an explanation is deliberately presented at a time when an automatic operation that the user likes is performed, such presentation may possibly interrupt the user who is viewing a television program.

In addition, in a case where the user's reaction is negative when an explanation for a reason for an automatic operation performed by the television reception apparatus 100 is presented, the operation determination unit 101 is retrained such that an automatic operation that the user likes will be performed, or the explanation generating unit 102 is retrained such that an operation reason explanation that the user is likely to accept can be presented. Further, only either the operation determination unit 101 or the explanation generating unit 102 may be retrained. Which one of the operation determination unit 101 or the explanation generating unit 102 should be retrained may be determined on the basis of the user's reaction to a presented explanation.

For example, in a case where the user says "stop it" when the television reception apparatus 100 changes the screen luminance according to the environment and presents the explanation "the luminance has been changed according to outside light" on a screen or by audio, the operation determination unit 101 learns no to adjust the luminance in this outside light situation. In addition, in a case where the television reception apparatus 100 asks a user "shall I stop processing" in response to the user's utterance "stop it" and there is the reply "yes" from the user, it is possible to confirm that the user is negative with respect to the automatic operation of changing the screen luminance according to the environment, and therefore, the operation determination unit

101 learns not to further perform processing of changing the screen luminance according to the environment.

In addition, when the television reception apparatus 100 automatically turns the volume up in response to a nearby noise, if the user operates a remote controller to turn the volume up more, this is also a user's negative reaction with respect to the automatic operation. In such a case, the operation determination unit 101 learns to turn the volume up more in response to a nearby noise.

J-2. Retraining Using a User Operation

In the processing procedure illustrated in FIG. 13, in a case where a user's reaction is negative with respect to an automatic operation performed by the television reception apparatus 100, an operation reason explanation therefor is presented to the user. Then, if the user's reaction to the presented explanation is negative, the respective trained DNNs that are used by the operation determination unit 101 and the explanation generating unit 102 are retrained. The user may operate a remote controller, etc., to set contents to be learned at a time of retraining.

For example, it is assumed that, when "high level of noise near the television" is detected on the basis of a sensing result from the sensor unit 350, an automatic operation is performed by the television reception apparatus 100 to turn subtitles on. FIG. 14 illustrates an example of a configuration of a screen for presenting an operation reason explanation. In a case where a user indicates a negative reaction to automatic display of subtitles, the operation reason explanation "subtitles are displayed because the level of noise near the television is high" is presented in the bottom-right corner of the screen, as indicated by a reference number 1401 in FIG. 14. Note that, in order not to interrupt the user who is viewing a television program, the explanation is presented in a screen corner, but, needless to say, the explanation may be displayed enlarged in the center of the screen. At this time, while the explanation is presented on the screen, the user may operate a remote controller to select the displayed explanation and press a button such as a determination button (OK button), to thereby transition to a setting screen related to learning contents, or the user may indicate by audio input that the user requires a setting, to thereby transition to the setting screen related to learning contents.

At this time, when the user operates a remote controller, etc., to notify the television reception apparatus 100 that learning contents used for retraining are to be set, a transition is made to a screen for setting learning contents for retraining in relation to the automatic operation, as illustrated in FIG. 15. In the example illustrated in FIG. 15, as indicated by a reference number 1501, the operation reason explanation "subtitles are displayed due to the following reason: level of noise near the television is high" is displayed in the upper part of the screen, and as indicated by a reference number 1502, a button "stop processing based on this reason" for the user to indicate an intention to stop the automatic operation based on this operation reason is displayed in the middle part of the screen. In addition, another reason for performing similar processing "similar processing will be performed in following cases: user who often uses subtitles is watching TV/there is program for which frequency of turning on subtitles is high" may also be presented in the bottom part of the screen as indicated by a reference number 1503. When the user operates a remote controller or a touch panel to select the button 1502, retraining is performed such that the television reception apparatus 100 does not subsequently perform the same processing by a similar reason. In addition, on the basis of, for example, an selection operation or a determination operation made on the presented contents represented by the reference number 1503, transition may be made to a setting screen related to each reason presented at the reference number 1503, and the user is allowed to perform a similar operation to the setting operation with respect to the reason represented by the reference number 1501 describe above.

Figure 16:
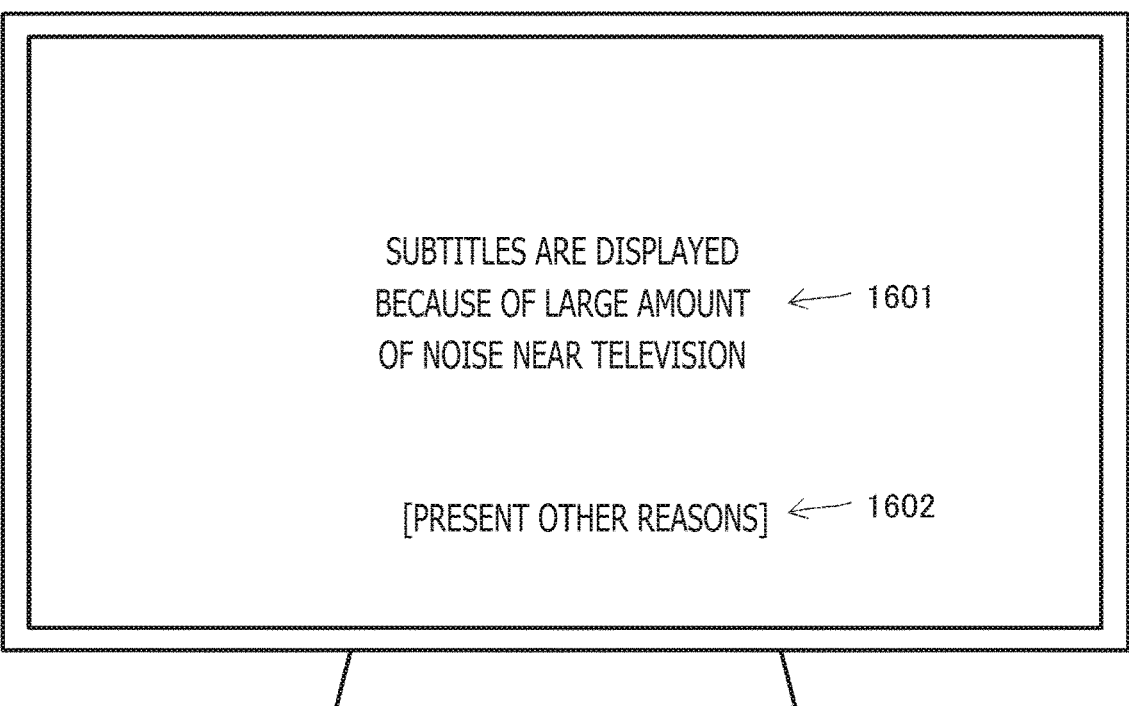
FIG. 16 is a view that illustrates an example of a configuration of a screen for presenting an operation reason explanation.

In addition, FIG. 16 illustrates another example of a configuration of a screen for presenting an operation reason explanation. In a case where a user indicates a negative reaction to automatic display of subtitles, the operation reason explanation "subtitles are displayed because of large amount of noise near the television" is presented in the center of the screen, as indicated by a reference number 1601 in FIG. 16. In addition, because there is possibility that the user may not accept the explanation displayed in the center of the screen, "[present other reasons]" which is a button for requesting another explanation for the operation reason is displayed at the bottom part in the screen, as indicated by a reference number 1602.

Figure 17:
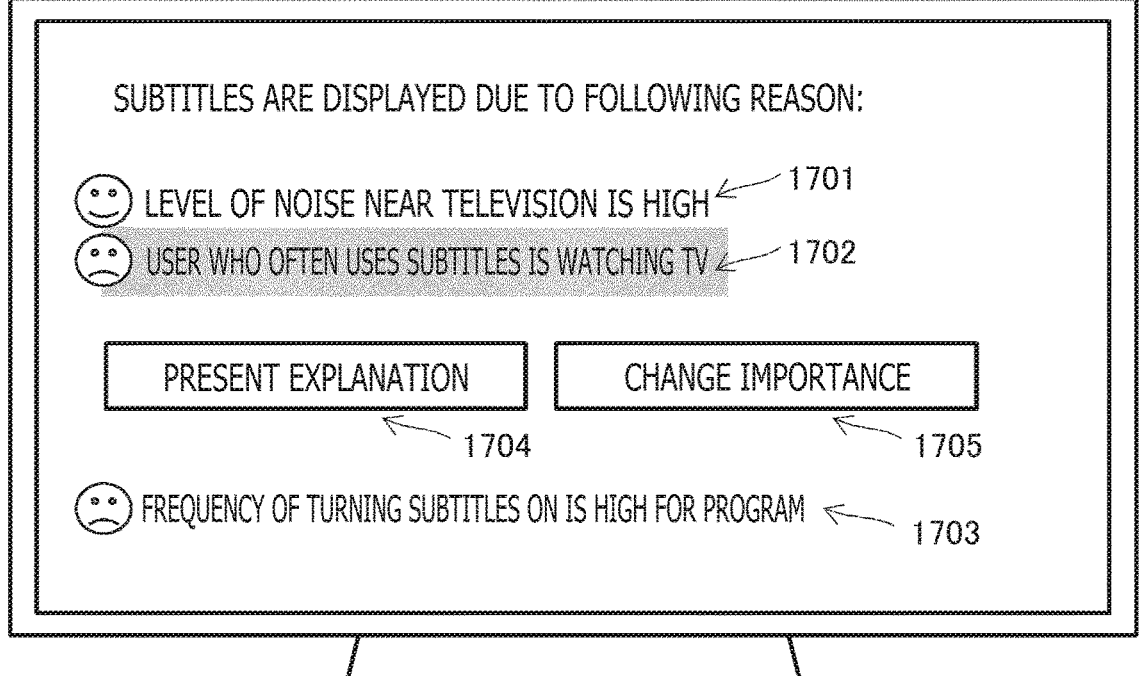
FIG. 17 is a view that illustrates an example of a configuration of a screen for setting learning contents for retraining.

At this time, when the user operates a remote controller or a touch panel to select the button 1602, a transition is made to a screen for setting learning contents for retraining in relation to the operation reason explanation, as illustrated in FIG. 17. In the example illustrated in FIG. 17, the other three types of operation reason explanations, that is, "level of noise near the television is high," "user who often uses subtitles is watching TV," and "frequency of turning on subtitles is high for this program," which are related to automatic display of subtitles, are displayed on the upper part of the screen, as indicated by reference numbers 1701 to 1703. The user can select any one of these three types of operation reason explanations by operating a cursor button on the remote controller, for example. In FIG. 17, the second explanation "user who often uses subtitles is watching TV" is selected, and subjected to a highlight display. In addition, directly below an explanation that the user is selecting, a button 1704 for designating an operation reason explanation for automatic subtitle display and a button 1705 for designating increasing of the importance of this explanation are displayed. When the user operates the remote controller or a touch panel to press either the button 1704 or the button 1705, processing indicated by the button is set as learning contents for retraining in relation to the operation reason explanation. Similarly, by selecting another explanation such an explanation as indicated by the reference number 1701 or 1703, the user may be allowed to perform a similar operation to a setting operation with respect to the reason represented by the reference number 1702 described above.

K. Presentation of an Explanation Using Another Device

Thus far, description has been given focusing on the embodiment in which the screen or a speaker of the television reception apparatus 100 is used to present, to the user, an operation reason explanation for an automatic operation performed by the television reception apparatus 100. As a modification, it is also possible to present an operation reason explanation by using another device that cooperates with the television reception apparatus 100, such as a smartphone that the user possesses or a smartphone, robot, etc., that interacts with the user.

For example, on the basis of a result of estimating the user's emotion from the user's reaction expressed when the television reception apparatus 100, a smartphone, a smart speaker, a robot, etc., is used to present an operation reason explanation, the explanation generating unit 102 learns, for each user or for each operation reason, which is the optimal device to use to present the explanation.

In addition, when a device with a small screen size, such as a smartphone, is used to present an explanation, the explanation generating unit 102 may learn an appropriate number of characters or a granularity for the explanation. Further, for example, in a case of a rollable display that uses an organic EL display, etc., it may be that an optimal let-out amount for the display may be learned according to contents of an explanation to be presented (for example, the number of characters in explanatory text, an image used for the explanation, etc.), or contents of the explanation may be learned according to a let-out amount for the display. In a case of presenting an explanation to a user who likes explanations that have a large amount of information, learning is performed such that a let-out amount for the display increases to enable more information to be displayed. For example, the current let-out amount for the display may be obtained by using the device state sensor unit 340, and learning of explanation contents or a determination of contents of an explanation to be displayed may be performed, or an appropriate let-out amount for the display may be determined.

L. Example of Application to Other Devices

The present disclosure is a technique pertaining to a device that explains, in a way that is easy for a user to understand, a reason for an automatic operation performed by a device that is equipped with a DNN. In other words, a device to which the present disclosure is applied learns explanatory text and an explanation presentation method which are easy for a user to accept (or to which the user indicates a positive reaction), according to a request by the user when an automatic operation is performed. The television reception apparatus has been described above as a concrete example of a device to which the present disclosure is applied, but the present disclosure can also be applied to various home appliance devices such as an air conditioner, a refrigerator, a washing machine, an audio device, an illumination device, or a smart speaker, or a mobile apparatus such as a car navigation system, an automated vehicle, or an unmanned aircraft (such as a drone).

Description is given below regarding an example in which the present disclosure is applied to audio guidance for a car navigation system.

Figure 18:
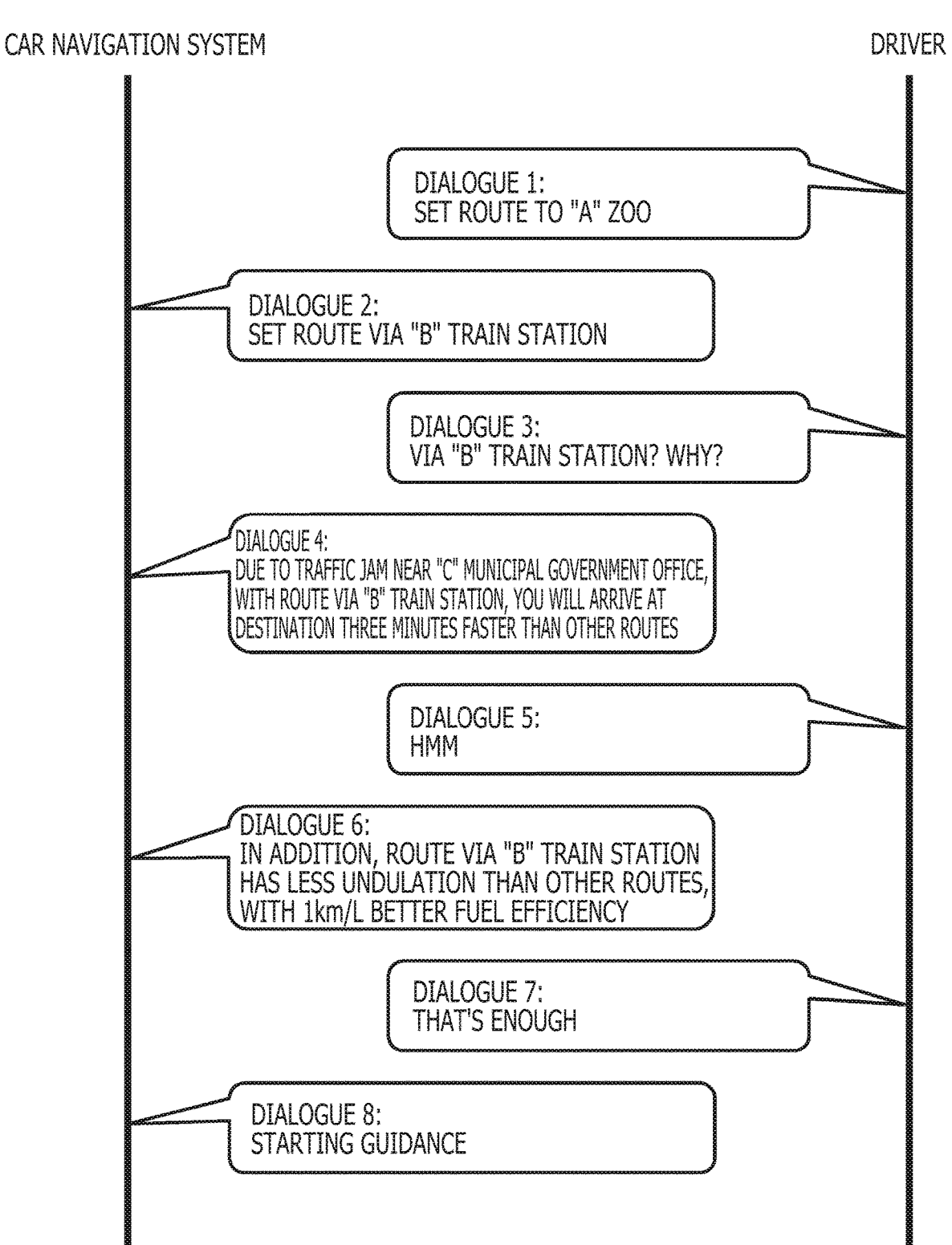
FIG. 18 is a view that illustrates an example of a dialogue between a car navigation system and a driver.

FIG. 18 illustrates an example of a dialogue between a car navigation system mounted to a vehicle and a driver of the vehicle, the dialogue being related to navigation.

When the driver makes an instruction to set a route to an "A" zoo in (dialogue 1), the car navigation system notifies that the route has been set via a "B" train station in (dialogue 2). In response to the notification, the driver says, "Via the "B" train station? Why?" in (dialogue 3), and the car navigation system interprets what the driver says as a request for an explanation for the reason why the automatic route setting has been performed. Then, in (dialogue 4) and (dialogue 6), the car navigation system explains the first reason for the route setting with "Due to traffic jam near a "C" municipal government office, with the route via the "B" train station, you will arrive at a destination three minutes faster than other routes." In response to this, when the driver says "hmm" in (dialogue 5), the car navigation system further continues to explain the second reason for the route setting with "In addition, the route via the "B" train station has less undulation than other routes, with 1 km/L better fuel efficiency." When the driver says, "That's enough" in (dialogue 7) with respect to the explanation of the second reason, the car navigation system estimates that the driver has reacted positively to the presentation of the explanation, announces "Starting guidance" in (dialogue 8), and ends the reason explanation. In addition, the car navigation system learns the following (1) or (2), for example, in relation to presentation of an explanation in a similar conversation thereafter.

(1) It is estimated that the driver has reacted positively to an explanation regarding an arrival time, and the system learns to present arrival time information as an explanation for a reason in similar dialogue thereafter.

(2) It is estimated that the driver does not like presentation of multiple explanations but likes short explanations, and the system learns to present only one explanation for a reason in a similar conversation thereafter.

Figure 19:
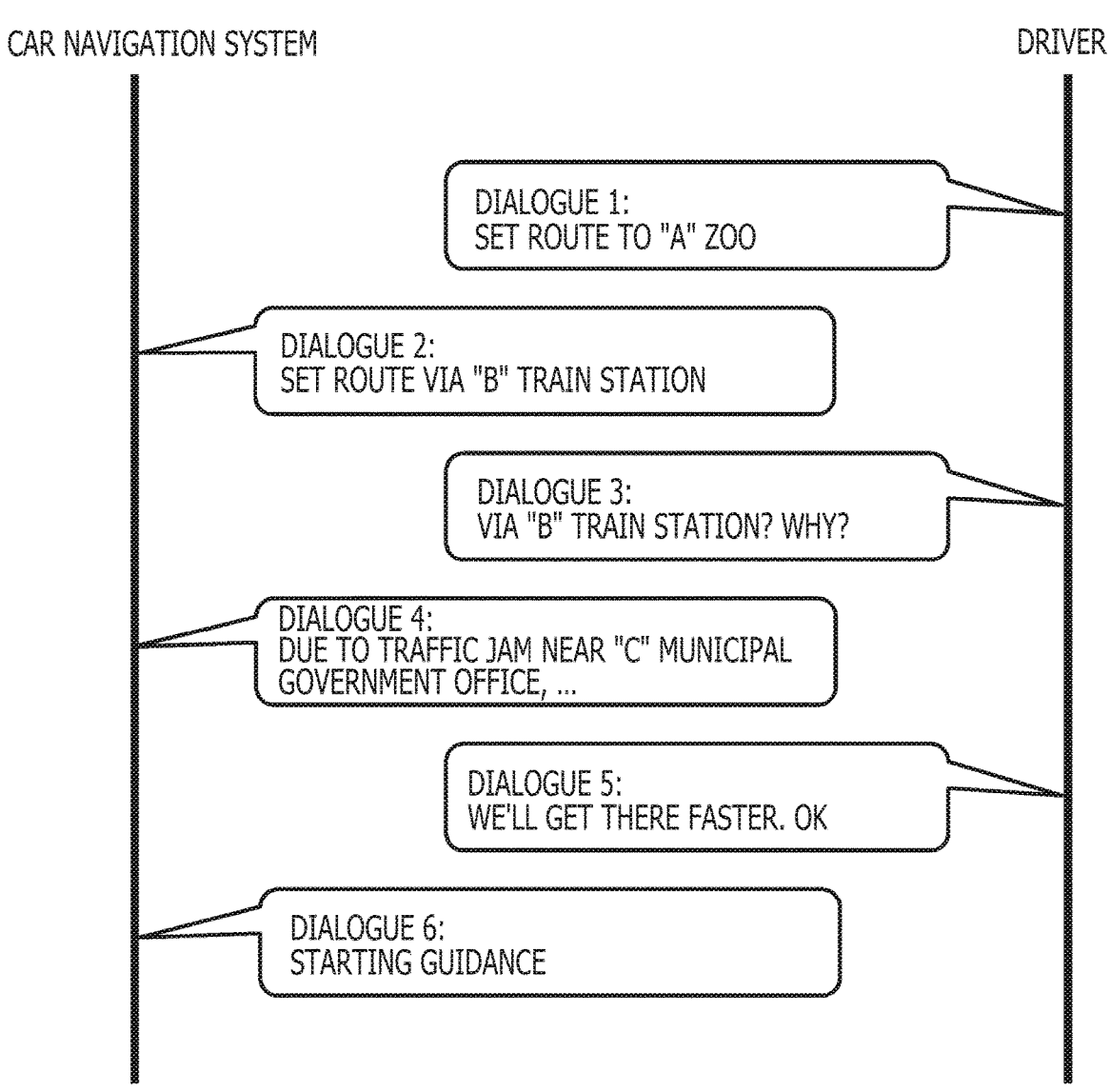
FIG. 19 is a view that illustrates an example of a dialogue between the car navigation system and the driver.

FIG. 19 illustrates another example of a dialogue between the car navigation system mounted to a vehicle and the driver of the vehicle, the dialogue being related to navigation.

When the driver makes an instruction to set a route to the "A" zoo in (dialogue 1), the car navigation system notifies that the route has been set via the "B" train station in (dialogue 2). In response to the notification, the driver says, "Via the "B" train station? Why?" in (dialogue 3), and the car navigation system interprets what the driver says as a request for an explanation for the reason why the automatic route setting has been performed. Then, in (dialogue 4), the car navigation system explains a reason for the route setting with "Due to traffic jam near the "C" municipal government office, . . . ." In the middle of the explanation, the driver starts saying "We'll get there faster. OK" in (dialogue 5). The car navigation system then estimates that the driver has reacted positively to the presented explanation, announces "Starting guidance" in (dialogue 6), and ends the reason explanation. In addition, the car navigation system learns the following (1) or (2), for example, in relation to presentation of an explanation in a similar conversation thereafter.

The system learns to present, as an explanation for a reason, the followings:

(1) select a Y route due to the traffic jam near X in similar dialogue thereafter (2) select the Y route in order to arrive (Z minutes) faster. The explanation "due to the traffic jam near X" is learned on the basis of contents produced by the car navigation system until there is a reaction from the driver with respect to an explanation presented by the car navigation system, and the explanation "in order to arrive (Z minutes) faster" is learned on the basis of the reaction from the driver who uttered "We'll get there faster."

In addition, because the driver started speaking in the middle of the explanation, the car navigation system learns that the driver does not like long explanations, and learns to present short and concise explanations even in relation to other operation reason explanations. For example, learning is performed to change a long explanation such as "the route via the "B" train station has less undulation than other routes, with 1 km/L better fuel efficiency" to a concise explanation such as "the Y route is selected because of good fuel efficiency." Note that, in a case where the explanation granularity is coarsened as a result of learning, the number of characters in an explanation decreases, and therefore, the explanation may be presented on a head-up display or an instrument panel, instead of audio.

Figure 20:
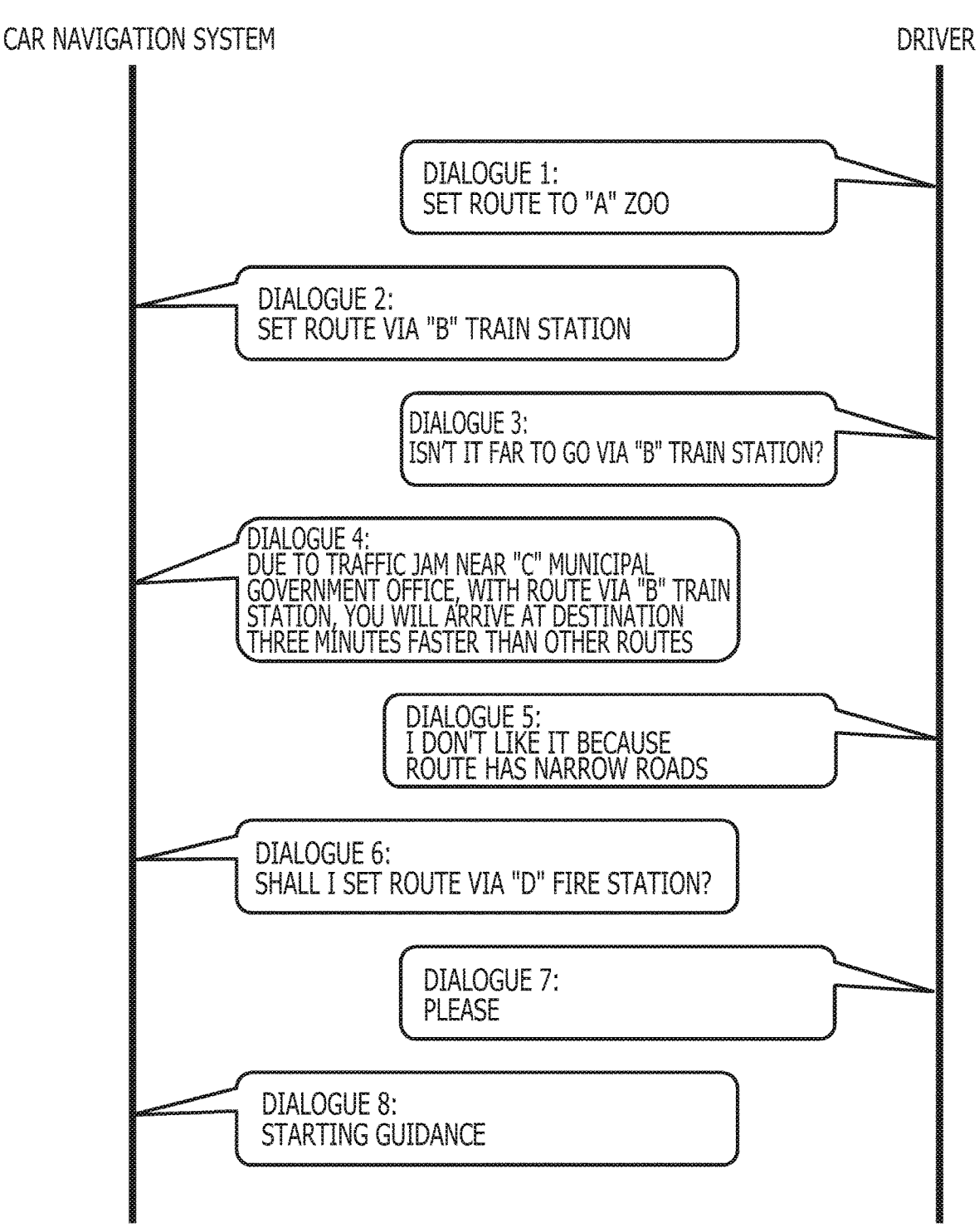
FIG. 20 is a view that illustrates an example of a dialogue between the car navigation system and the driver.

FIG. 20 illustrates yet another example of a dialogue between the car navigation system mounted to a vehicle and the driver of the vehicle, the dialogue being related to navigation.

When the driver makes an instruction to set a route to the "A" zoo in (dialogue 1), the car navigation system notifies that the route has been set via the "B" train station in (dialogue 2). In response to the notification, the driver says, "Isn't it far to go via the "B" train station?" in (dialogue 3), and the car navigation system interprets what the driver says as a negative reaction from the driver to the automatic route setting. Then, in (dialogue 4), the car navigation system explains a reason for the route setting with "Due to traffic jam near the "C" municipal government office, with the route via the "B" train station, you will arrive at destination three minutes faster than other routes." When the driver says, "I don't like it because that route has narrow roads" in (dialogue 5) with respect to the explanation for the reason for this route setting, the car navigation system estimates that the driver has negatively reacted to the explanation for the reason for the route setting, and proposes another route setting with "Shall I set a route via "D" fire station?" in (dialogue 6). Because the driver says "Please" in (dialogue 7), the car navigation system estimates that the driver has positively reacted to the proposed route, announces "Starting guidance" in (dialogue 8), and sets this route. In addition, the car navigation system learns the following (1) or (2), for example, in relation to route settings in a similar conversation thereafter.

(1) Avoid routes via near the "B" train station (or reduce priority of routes via near the "B" train station)

(2) Avoid routes through narrow roads (or reduce priority of routes through narrow roads)

Note that, for example, in a case where it is interpreted that the user has reacted negatively in (dialogue 5) to explanation contents, the car navigation system presents another reason for the route setting in (dialogue 6) if there is another explanation.

In addition, as one example, the present disclosure may be performed by a robot including a humanoid robot, an animal robot, a spherical robot, or a cylindrical robot, or by a character displayed on a display. For example, presentation of an explanation to a user may be expressed by gestures of a humanoid robot or a humanoid character displayed on the display, or may be expressed by an motion of an animal robot or an animal character displayed on the display, or an motion of a robot having another shape or a character.

INDUSTRIAL APPLICABILITY

Hereinabove, description has been given in detail regarding the present disclosure, with reference to a specific embodiment. However, it is obvious that the embodiment can be modified or substituted by a person having ordinary skill in the art without departing from the substance of the present disclosure.

In the present specification, description has mainly been given focusing on the embodiment in which the present disclosure is applied to the television reception apparatus, but the substance of the present disclosure is not limited to this. The present disclosure can similarly be applied to various devices that perform an automatic operation by applying a DNN to internal processing. For example, it is possible to apply the present disclosure to various home appliance devices such as an air conditioner, a refrigerator, a washing machine, an audio device, an illumination device, or a smart speaker. In addition, the present disclosure can also be applied to a mobile apparatus that performs an automated operation, such as a car navigation system, an automated vehicle, or an unmanned aircraft (such as a drone).

Essentially, the present disclosure has been described using examples, and the contents described in the present specification should not be construed in a limited way. In order to determine the substance of the present disclosure, the scope of claims should be considered.

Note that the present disclosure can also have the following configurations.

(1)

An information processing apparatus including:

a determination unit that determines processing in a control-target apparatus corresponding to sensor information;

a generation unit that generates an explanation for a reason for the processing; and an estimation unit that performs an estimation with respect to a reaction from a user, in which the generation unit controls presentation of the explanation on the basis of a result of the estimation with respect to the reaction from the user.

(2)

The information processing apparatus according to the abovementioned (1), in which the generation unit controls, on the basis of the result of the estimation, contents of the explanation or a method of presenting the explanation.

(3)

The information processing apparatus according to the abovementioned (2), in which the generation unit controls, on the basis of the result of the estimation, a granularity of information to be presented as the explanation, a method of expressing explanatory text, selection of a device to be used for output of the explanation, or a setting (a text font and a text size in a case of using a screen, and volume and an audio quality in a case of using audio) on the device to be used for the output of the explanation.

(4)

The information processing apparatus according to any one of the abovementioned (1) to (3), in which the generation unit includes a first machine learning model that has been trained to estimate an explanation for a reason for processing in the control-target apparatus corresponding to the sensor information, and uses the first machine learning model to generate an explanation for the processing.

(5)

The information processing apparatus according to the abovementioned (4), in which the first machine learning model is retrained on the basis of an explanation generated with respect to processing performed by the control-target apparatus according to the sensor information, and of a reaction from a user.

(6)

The information processing apparatus according to the abovementioned (5), in which, on the basis of the reaction from the user to the explanation generated with respect to the processing performed by the control-target apparatus, the first machine learning model learns not to present similar contents of an explanation with respect to processing in the control-target apparatus or not to use a similar method of presenting an explanation.

(7)

The information processing apparatus according to the abovementioned (5) or (6), in which the first machine learning model is retrained on the basis of at least one of environment information, device information, a user profile, or a device usage history of a user.

US 12,596,956 B2

39 40

(8)

The information processing apparatus according to any one of the abovementioned (1) to (7), in which the generation unit controls presentation of the explanation on the basis of a request from the user.

(9)

The information processing apparatus according to any one of the abovementioned (1) to (8), in which the generation unit controls presentation of the explanation on the basis of a negative reaction from a user to the processing determined by the determination unit and performed by the control-target apparatus.

(10)

The information processing apparatus according to any one of the abovementioned (1) to (9), in which the determination unit includes a second machine learning model that has been trained to estimate processing in the control-target apparatus corresponding to the sensor information, and uses the second machine learning model to determine processing in the control-target apparatus corresponding to the sensor information.

(11)

The information processing apparatus according to the abovementioned (10), in which the second machine learning model is retrained on the basis of processing performed by the control-target apparatus according to the sensor information, and of a reaction from a user.

(12)

The information processing apparatus according to the abovementioned (11), in which, on the basis of a negative reaction from a user to processing performed by the control-target apparatus according to the sensor information, the second machine learning model learns not to determine the processing performed by the control-target apparatus.

(13)

The information processing apparatus according to any one of the abovementioned (1) to (12), in which the estimation unit includes a third machine learning model that has been trained to estimate an emotion held by a user on the basis of a reaction from the user, and uses the third machine learning model to estimate an emotion held by a user with respect to processing performed by the control-target apparatus or a presented explanation for the processing.

(14)

The information processing apparatus according to any one of the abovementioned (1) to (13), including:

a control unit that controls notification processing related to at least either processing determined by the determination unit or presentation of an explanation controlled by the generation unit.

(15)

The information processing apparatus according to the abovementioned (14), in which the control unit controls processing for notifying that the processing determined by the determination unit or the presentation of the explanation controlled by the generation unit uses a machine learning model.

(16)

The information processing apparatus according to any one of the abovementioned (1) to (15), in which the generation unit presents, in order or simultaneously, two or more of multiple reason explanations for one piece of processing in the control-target apparatus.

(17)

The information processing apparatus according to any one of the abovementioned (1) to (16), further including:

a user interface output unit that outputs a user interface for obtaining a reaction to an explanation presented by the generation unit.

(18)

The information processing apparatus according to any one of the abovementioned (1) to (17), including:

a display unit for displaying the explanation.

(19)

An information processing method including:

a determination step of determining processing in a control-target apparatus corresponding to sensor information;

a generation step of generating an explanation for a reason for the processing; and an estimation step of performing an estimation with respect to a reaction from a user, in which in the generation step, presentation of the explanation is controlled on the basis of a result of the estimation with respect to the reaction from the user.

(20)

A computer program that is written in a computer-readable format and causes a computer to function as:

a determination unit that determines processing in a control-target apparatus corresponding to sensor information;

a generation unit that generates an explanation for a reason for the processing; and an estimation unit that performs an estimation with respect to a reaction from a user, in which the generation unit controls presentation of the explanation on the basis of a result of the estimation with respect to the reaction from the user.

REFERENCE SIGNS LIST

100: Television reception apparatus
101: Operation determination unit
102: Explanation generating unit
103: User emotion estimation unit
111: Operation history memory
112: User information database
201: Control unit
202: Bus
203: Storage unit
204: Communication interface (IF) unit
205: Expansion interface (IF) unit
206: Tuner/demodulation unit
207: Demultiplexer
208: Video decoder
209: Audio decoder
210: Text superimposition decoder
211: Subtitle decoder
212: Subtitle processing unit
213: Data decoder
214: Cache unit
215: Application (AP) control unit
216: Browser unit
217: Sound source unit
218: Video processing unit
219: Display unit
220: Audio processing unit
221: Audio output unit
222: Operation input unit
300: Sensing function unit 310: Camera unit
311 to 313: Camera
320: User state sensor unit
330: Environment sensor unit
340: Device state sensor unit
350: User profile sensor unit
The invention claimed is:

1. An information processing apparatus, comprising:
circuitry configured to:
receive sensor information corresponding to a control-target apparatus and an environment of a user;
determine, based on the sensor information, an operation to be executed in the control-target apparatus;
generate an explanation for a reason for the determined operation;
estimate a reaction from the user based on the generated explanation; and
control presentation of the explanation based on a result of the estimation of the reaction from the user, wherein the control of the presentation of the explanation includes:
control of selection of an output device among a plurality of output devices to be used for output of the explanation, and
transmission of a control signal to the selected output device to output the explanation with device-specific settings.

2. The information processing apparatus according to claim 1, wherein the control of the presentation of the explanation further includes control of
a granularity of information to be presented as the explanation,
a method of expressing explanatory text,
or
a setting that includes a text font and a text size in a case of using a screen, and volume and an audio quality in a case of using audio on the output device to be used for the output of the explanation.

3. The information processing apparatus according to claim 1, wherein the circuitry is further configured to utilize a first machine learning model, that has been trained to estimate the explanation for the reason for the operation to be executed in the control-target apparatus corresponding to the sensor information, to generate the explanation for the operation.

4. The information processing apparatus according to claim 3, wherein the first machine learning model is retrained based on the generated explanation with respect to the operation executed by the control-target apparatus, and the reaction from the user.

5. The information processing apparatus according to claim 4, wherein,
based on a negative reaction from the user to the explanation generated with respect to the operation executed by the control-target apparatus, the first machine learning model learns not to present specific type of content for the explanation related to the operation in the control-target apparatus or not to use a specific type of method of to present the explanation.

6. The information processing apparatus according to claim 4, wherein the first machine learning model is retrained based on at least one of environment information, device information, a user profile, or a device usage history of the user.

7. The information processing apparatus according to claim 1, wherein the circuitry is further configured to control the presentation of the explanation based on a request from the user.

8. The information processing apparatus according to claim 1, wherein the circuitry is further configured to control the presentation of the explanation based on a negative reaction from the user to the determined operation executed by the control-target apparatus.

9. The information processing apparatus according to claim 1, wherein the circuitry is further configured to utilize a second machine learning model, that has been trained to estimate the operation in the control-target apparatus corresponding to the sensor information, to determine the operation in the control-target apparatus corresponding to the sensor information.

10. The information processing apparatus according to claim 9, wherein the second machine learning model is retrained based on the operation executed by the control-target apparatus, and the reaction from the user.

11. The information processing apparatus according to claim 10, wherein, based on a negative reaction from the user to the operation executed by the control-target apparatus, the second machine learning model learns not to determine the operation executed by the control-target apparatus.

12. The information processing apparatus according to claim 1, wherein the circuitry is further configured to utilize a third machine learning model, that has been trained to estimate an emotion held by the user based on the reaction from the user, to estimate the emotion held by the user with respect to the operation executed by the control-target apparatus or the presented explanation for the operation.

13. The information processing apparatus according to claim 1, wherein the circuitry is further configured to control a notification operation related to at least one of the determined operation or the presentation of the explanation.

14. The information processing apparatus according to claim 13, wherein the circuitry is further configured to control the notification operation to notify that the determined operation or the presentation of the explanation uses a machine learning model.

15. The information processing apparatus according to claim 1, wherein the circuitry is further configured to present, in order or simultaneously, two or more of multiple reason explanations for the operation in the control-target apparatus.

16. The information processing apparatus according to claim 1, further comprising a user interface output device configured to output a user interface to obtain the reaction of the user to the explanation.

17. The information processing apparatus according to claim 1, further comprising
a display configured to display the explanation.

18. An information processing method, comprising:
receiving, by circuitry, sensor information corresponding to a control-target apparatus and an environment of a user;
determining, by the circuitry, an operation to be executed in the control-target apparatus based on the sensor information;
generating, by the circuitry, an explanation for a reason for the determined operation;
estimating, by the circuitry, a reaction from the user based on the generated explanation; and
controlling, by the circuitry, presentation of the explanation based on a result of the estimation of the reaction from the user, wherein
the controlling of the presentation of the explanation includes:

controlling, by the circuitry, selection of an output device among a plurality of output devices to be used for output of the explanation, and transmitting, by the circuitry, a control signal to the selected output device to output the explanation with device-specific settings.

19. A non-transitory computer-readable medium having stored thereon, computer-executable instructions which, when executed by a computer, cause the computer to execute operations, the operations comprising:

receiving sensor information corresponding to a control-target apparatus and an environment of a user;

determining an operation to be executed in the control-target apparatus based on the sensor information;

generating an explanation for a reason for the determined operation;

estimating a reaction from the user based on the generated explanation; and controlling presentation of the explanation based on a result of the estimation of the reaction from the user, wherein the controlling of the presentation of the explanation includes:

controlling selection of an output device among a plurality of output devices to be used for output of the explanation, and transmitting a control signal to the selected output device to output the explanation with device-specific settings.

\* \* \* \* \*